United States Patent
Brandt et al.

[19]

[11] Patent Number: 6,021,430
[45] Date of Patent: Feb. 1, 2000

[54] OUTPUT INTERFACE METHOD AND SYSTEM FOR ENHANCED DATA TRANSFERS VIA COOPERATIVE SERVICE INTERFACE

[75] Inventors: Mark Steven Brandt, Laguna Beach, Calif.; Lois Bridgham Coyne, Lansdale, Pa.; Robert Frank Inforzato; Sarah Knerr Inforzato, both of Downingtown, Pa.; Susan Mary Jennion, Chester Springs, Pa.; Charles Austin Parker, Exton, Pa.

[73] Assignee: Unisys Corporation, Blue Bell, Pa.

[21] Appl. No.: 09/060,649

[22] Filed: Apr. 15, 1998

[51] Int. Cl.[7] ................................................ G06F 13/00
[52] U.S. Cl. .......................... 709/213; 709/212; 709/216; 709/231
[58] Field of Search ................................... 709/212, 213, 709/216, 231; 710/129, 200

[56] References Cited

U.S. PATENT DOCUMENTS

| | | | |
|---|---|---|---|
| 4,965,719 | 10/1990 | Shoens et al. | 709/300 |
| 5,247,672 | 9/1993 | Mohan | 709/250 |
| 5,299,313 | 3/1994 | Petersen et al. | 709/234 |
| 5,434,976 | 7/1995 | Tan et al. | 709/234 |
| 5,784,622 | 7/1998 | Kalwitz et al. | 709/213 |
| 5,812,775 | 9/1998 | Van Seters et al. | 709/213 |
| 5,909,546 | 6/1999 | Osborne | 709/212 |

*Primary Examiner*—Krisna Lim
*Attorney, Agent, or Firm*—Alfred W. Kozak; Mark T. Starr; Steven B. Samuels

[57] ABSTRACT

An Output Interface function for a Cooperative Service Interface which allows export of data from a Distributed System Services unit (DSS) to a Network Provider unit (NP) whereby lock pools are shared as well as buffer pools in each unit. Copying of exported data from said DSS to said NP is eliminated by use of an image buffer pool in said Network Provider (NP) (Which holds pointers to data in memory) and which can export the data to an external I/O port.

11 Claims, 9 Drawing Sheets

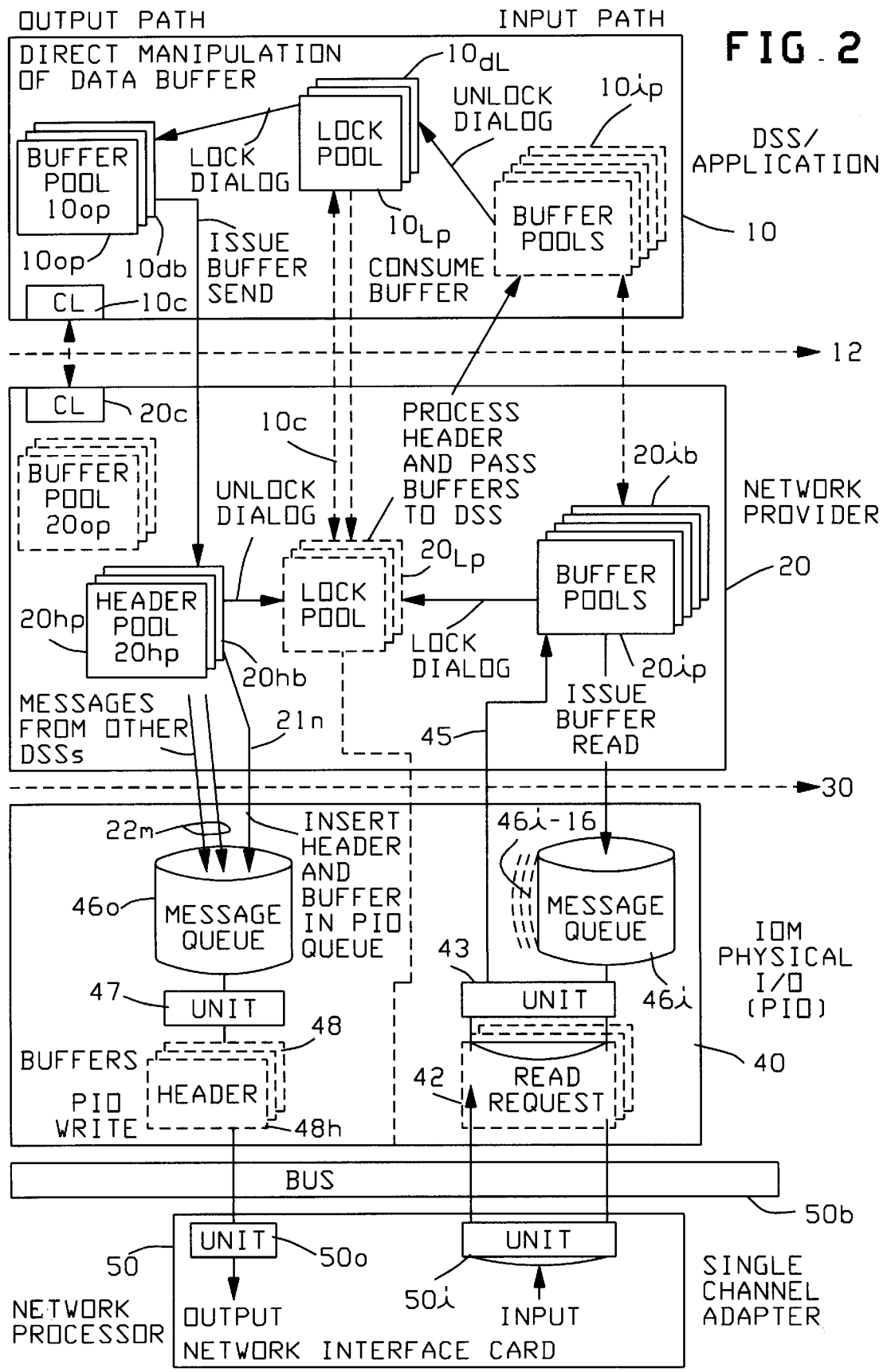

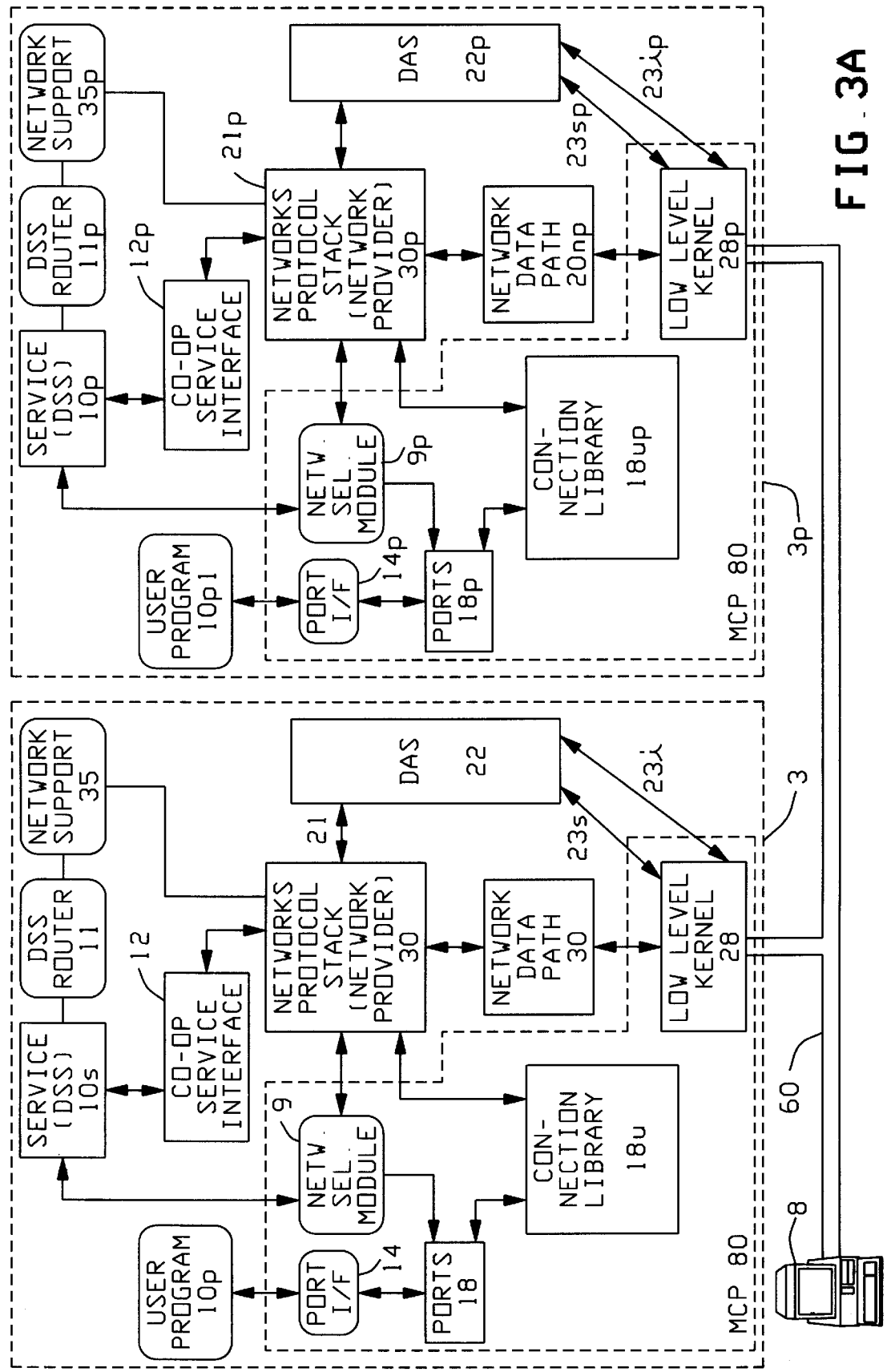

OUTPUT INTERFACE METHOD AND SYSTEM FOR ENHANCED DATA TRANSFERS VIA COOPERATIVE SERVICE INTERFACE

CROSS REFERENCE TO RELATED APPLICATIONS

This application is related to co-pending application U.S. Ser. No. 09/060,650 entitled "COOPERATIVE SERVICE INTERFACE WITH BUFFER AND LOCK POOL SHARING, FOR ENHANCING MESSAGE DIALOG TRANSFER BETWEEN NETWORK PROVIDER AND DISTRIBUTED SYSTEM SERVICES" which is incorporated by reference.

Also incorporated by reference are the following co-pending cases:

U.S. Ser. No. 09/060,651 entitled "Network Data Path Interface Method and System for Enhanced Data Transmission";

U.S. Ser. No. 09/060,647 entitled "Multiple Interface High Speed Data Com System and Method Utilizing Multiple Connection Library Interfaces With Buffer and Lock Pool Sharing";

U.S. Ser. No. 09/060,648 entitled "Connection Library Interface System and Method for Process Inter-Communication Manager and Process Inter-Communication Element".

FIELD OF THE INVENTION

The present disclosure relates to high-speed data communication systems having interfaces to provide performance improvements for Network Providers and their Users.

BACKGROUND OF THE INVENTION

In the data communication field involving computers and networking, there is a basic concept of the "dialog", which in computing circles, involves the exchange of human input and the immediate machine response that forms a "conversation" between an interactive computer and person using it. Another aspect of the "dialog" is the reference to the exchange of signals by computers communicating on a network. Dialogs can be used to carry data between different application processes, and can be used to carry data over computer networks. In computer networking, dialogs can be considered to provide data communication between application processes running on different systems or different hosts. Further, dialogs can carry data between application processes running on the same host.

There is a generally recognized OSI (Open System Interconnection) standard for worldwide message transfer communications that defines a framework for implementing transfer protocols in 7 layers. Control is passed from one layer to the next, starting at the layer called "the Application Layer" in one station, proceeding to the bottom layer, over the channel to the next station, and back up the layers of a hierarchy which is generally recognized as having 7 layers. Most of all communication networks use the 7-layer system. However, there are some non-OSI systems which incorporate two or three layers into one layer.

The layers involved for network Users are generally designated from the lowest layer to the highest layer, as follows:

1. The Physical Layer;
2. The Datalink Layer;
3. The Network Layer;
4. The Transport Layer;
5. The Session Layer;
6. The Presentation Layer; and
7. The Application Layer.

The Application Layer 7 (top layer) defines the language and syntax that programs use to communicate with other programs. It represents the purpose of communicating. For example, a program in a client workstation uses commands to request data from a program in a server. The common functions at this Application Layer level are that of opening, closing, reading and writing files, transferring files and e-mail, executing remote jobs, and obtaining directory information about network resources.

The Presentation Layer 6 acts to negotiate and manage the way the data is represented and encoded between different computers. For example, it provides a common denominator between ASCII and the EBCDIC machines, as well as between different floating point and binary formats. This layer is also used for encryption and decryption.

The Session Layer 5, coordinates communications in an orderly manner. It determines one-way or two-way communications, and manages the dialog between both parties, for example, making sure that the previous request has been fulfilled before the next request is sent. This Session Layer also marks significant parts of the transmitted data with checkpoints to allow for fast recovery in the event of a connection failure. Sometimes the services of this session layer are included in the Transport Layer 4.

The Transport Layer 4, ensures end to end validity and integrity. The lower Data Link Layer (Layer 2) is only responsible for delivering packets from one node to another). Thus, if a packet should get lost in a router somewhere in the enterprise internet, the Transport Layer will detect this situation. This Transport Layer 4 ensures that if a 12 MB file is sent, the full 12 MB will be received. OSI transport services sometimes will include layers 1 through 4, and are collectively responsible for delivering a complete message or file from a sending station to a receiving station without error.

The Network Layer 3 routes the messages to different networks. The node-to-node function of the Datalink Layer (Layer 2) is extended across the entire internetwork, because a routable protocol such as IP, IPX, SNA, etc., contains a "network address" in addition to a station address. If all the stations are contained within a single network segment, then the routing capability of this layer is not required.

The Datalink Layer 2 is responsible for node-to-node validity and integrity of the transmission. The transmitted bits are divided into frames, for example, an Ethernet, or Token Ring frame for Local Area Networks (LANs). Layers 1 and 2 are required for every type of communication operation.

The Physical Layer 1 is responsible for passing bits onto and receiving them from the connecting medium. This layer has no understanding of the meaning of the bits, but deals with the electrical and mechanical characteristics of the signals and the signaling methods. As an example, the Physical Layer 1 comprises the RTS (Request to Send) and the CTS (Clear to Send) signals in an RS-232 (a standard for serial transmission between computers and peripheral devices) environment, as well as TDM (Time Division Multiplexing) and FDM (Frequency Division Multiplexing) techniques for multiplexing data on a line.

It will be seen that present-day communication systems generally will have a high band-pass capability of data throughput for high speed network technologies which may occur at rates on the order of 100 MB per second, to 1 gigabit per second.

However, sometimes the problems of delays or latency may be high. Latency is generally considered to be the time interval between the time a transaction issues and the time the transaction is reported as being completed. In certain systems having a high latency, the round-trip time for two clients communicating with each other to complete a data request can be on the order of milliseconds.

The delays in communication due to "latency" will be seen to occur from conventional communication systems due partly to overhead in the communication layers, and generally is especially due to latency in the layers below the Transport Layer 4, i.e., Layers 3, 2 and 1.

In high speed data communication systems, the Transport Layer 4 is still seen to impart substantial latency in communications.

The present method and system describes the functions and sequential operations for and Output Interface of a Cooperative Service Interface between Network Providers and their Users, such as DSSs (Distributed System Service) units which enhances the speed of dialog exchanges and this improves communication system performance. Further, the present Output Interface is used to supersede previously used sync Port Interfaces which had a number of latency problems. The sync Port Interfaces used an earlier Connection Block technology which had extra sublayers in the data path and had locking protocols which were not integrated so that each module had its own private lock which required considerable time to be spent in locking, unlocking and synchronization.

SUMMARY OF THE INVENTION

A Cooperative Services Interface is used to control message dialog transfers between a Distributed System Service (DSS) program and a Network Provider's layer of protocol. The Cooperative Services Interface involves a series of connections, connection rules, procedure headings and shared states implemented via a Connection Library (CL).

The DSS operates at the Application Layer services of the OSI (Open Systems Interconnection Standards) while the Network Provider implements the Session, Transport, and Network Layers.

An output channel from the DSS builds a particular message in a buffer for use of a particular message dialog and instructs the Network Provider to build a protocol header in another buffer to concatenate the two buffers for transmittal to a message queue in an I/O module.

Image pointers in the DSS and the Network Provider provide access to messages in memory without having to actually move buffer data across the Cooperative Services Interface.

Buffer sharing is implemented so that the Network Protocol Stack of the Network Provider has "input" buffers whereby ownership of these "input" buffers is logically transferred to the DSS when the DSS chooses to retain ownership of a buffer (holding a dialog message) delivered to the DSS. Sharing reduces need for data copying and enhances performance. Ownership of these shared buffers is returned to the original owner when the borrowing User is finished with the buffer.

Then also, ownership of "Output" buffers in the DSS logically transferred to the Network Provider for transmission when an output dialog is requested. Ownership of these shared buffers is returned to the original owner when the borrowing User is finished with the buffer.

Additionally, a locking system is used whereby dialog locks are shared between the DSS and Network Provider making code easier to implement for increased performance.

BRIEF DESCRIPTION OF THE DRAWINGS

FIG. 2 is a networking software architectural diagram used to illustrate elements of the Cooperative Service Interface;

FIG. 3A is a multiple peer network drawing showing the placement of the Cooperative Service Interface in each of two systems on a computer network.

GLOSSARY LIST

1. Distributed System Services (DSS)

Figure 1:
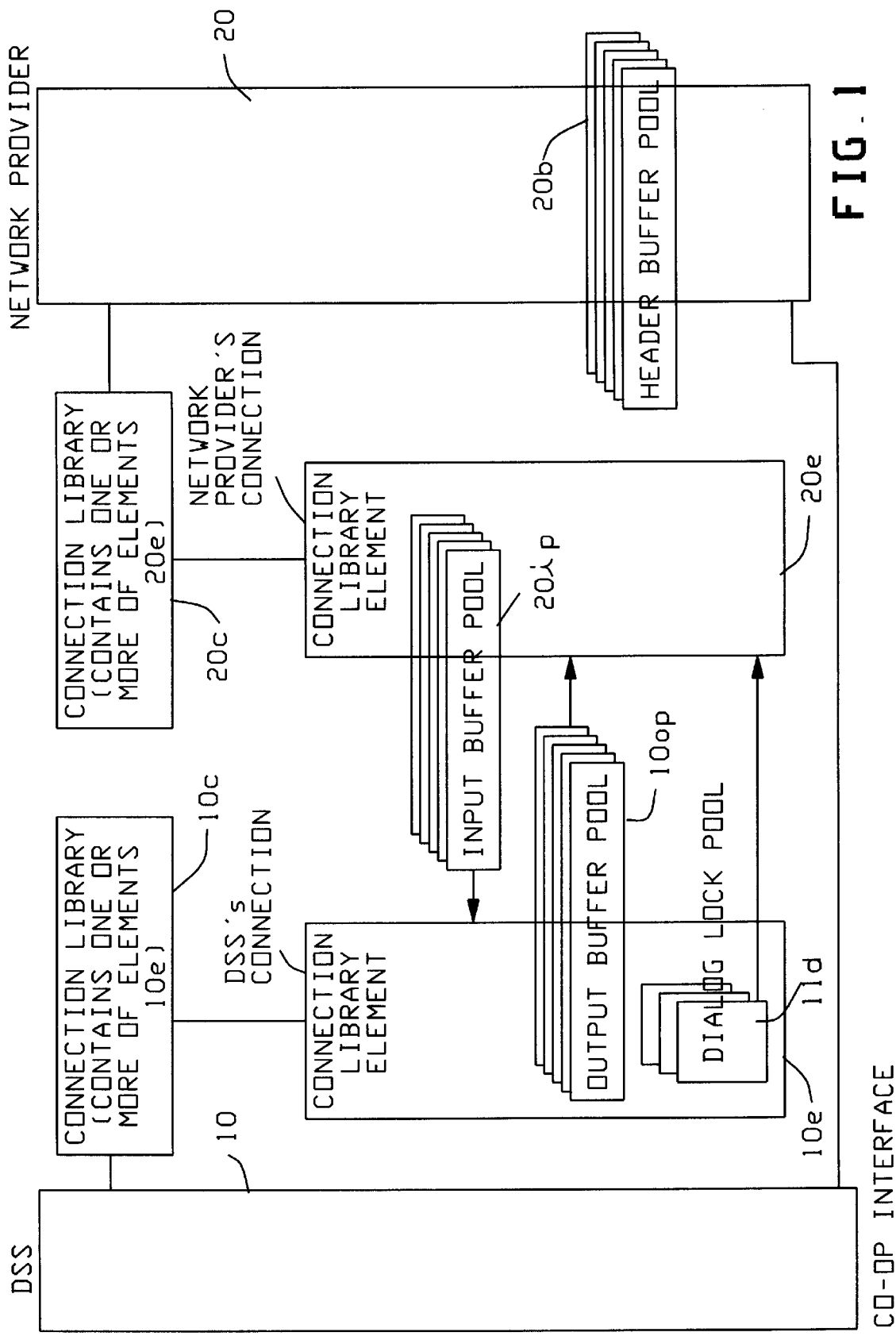
FIG. 1 is a diagram illustrating how buffers and locks are shared between a Distributed System Service (DSS) and a Network Provider (NP) using a Connection Library facility of a Cooperative Service Interface.

One of a collection of services provided on Unisys Host computers to support communication across multi-host networks. DSSs can be services such as file handling, station transfer, and mail transfer.

2. Cooperative Service Interface (Co-op)

A systems level, connection-library based interface which allows the Distributed System Services (DSS) to communicate across the network with their peers. A system and method for using the services of a network provider to communicate with another instance of themselves somewhere else enabling communication to occur across a network.

3. Connection Library (CL)

This is method of connecting two code files together at run time so that they can use each other's services. The Connection Library is a collection of one or more connection library elements and a library template. The "Library Template" is a structure that is built by the compiler and maintained by the Master Control Program (MCP) that determines what the procedures and functions and items that you are trying to import from the library. This involves a multiplicity of Connection Library elements. A Connection Library (or Server Library) permits access to another program's exported procedures and data. Connection Libraries allow one or more instances of two-way access, to the other program, and from the other program to the Library. Server Libraries allow only once instance of one-way access.

4. The Port File

A port file is an interface that allows programs to talk to their peers on the same system or other systems and which is based on the file interface. The "file interface" is used for disks, tapes, and card readers and all the traditional peripheral types and the port file provides adaptation of that interface for interprocess communication.

5. Sync Port Connection Block (CB)

This was an older version of the cooperative interface which did not permit lock sharing or buffer sharing. Connection Block later evolved into more versatile operations as Connection Libraries and likewise the co-op interface was the evolution of improvements to the Sync Port Interface. The Sync Port Interface uses connection blocks while the more highly developed co-op interface uses Connection Libraries whereby the new co-op interface used buffer sharing, lock sharing and fault management.

6. Provider

Provider is just a system or operation or a piece of software that provides a service. It could be looked at as a collection of software that provides a service.

7. Process Intercommunication Element-Connection Library (PIE-CL)

This is the interface used by the port interface software to talk to the Network Provider.

8. Process Intercommunication Element-Connection Block (PIE-CB)

This is an interface used by the port interface software to talk to the Network Provider using an earlier form of technology designated as the connection block technology. The old PIE-CB technology did not provide for lock sharing and buffer sharing but the new PIE-CL (Connection Library) does provide lock sharing and buffer sharing.

9. Scatter Consolation

This is code put into NP Support software to make a machine which does not have hardware scatter capabilities appear to have scatter capabilities. Scatter is the operation of taking data coming in off an I/O bus and putting it into multiple different areas in the local memory, that is to say, it is scattered around.

10. Distributed Application Supervisor (DAS)

This is a unit that has a function of determining what software should be loaded into the channel adapter, into the integrated communications processor (ICP) etc. It also is used to manage exceptions that it may notice, for example, such as software that is running in the ICP, which may detect some error and then the DAS must determine how to handle the error.

11. Network Support

A process which controls when Network Providers and DSSs are initiated and terminated and which routes network-related operator entered commands and their responses.

11a. NP Support

Network Processor Support. The software which allows Network Provider access to the Input and Output Queues, which contains Multiqueue Simulation software, and which multiplexes and demultiplexes data across the single input and output queues used in the earlier method of implementation of functions for a network data path interface.

12. Multiple Queue

There are I/O queues between the host memory and channel adapter card. The present system can define up to 16 queues in its I/O architecture which is an advantage over the earlier use of only two queues which involved one queue for input and one queue for output. Putting in multiple queues, gave each module a direct queue so that there was no need for multiplexing over one queue and then de-multiplexing on the other end. Thus, now each receiver would have its own queue.

12a. MQ simulation software is in NP Support which "simulates" Multiple Queues on systems where the hardware does not support multiple queues.

13. Connection Block (CB)

This is a method of connecting two code files together at run time so that they can use each other's services. It is similar to a file or a task or a job or a database or any of these types of abstract objects that are used in a given program. A CB is a less robust implementation of a Connection Library (CL).

14. Supervisor CB/CL

This involves the supervisor connection block/connection library and this is the interface object that the NP Support uses to talk to the distributed application supervisor (DAS).

15. Physical I/O

The Physical I/O system is part of the Master Control Program of the Unisys computer system hierarchy. This involves the software that talks to the hardware controllers. For example, it operates so as to indicate that it wants sector 35 off disk 22 and seeks 57 bytes from that location.

16. Logical I/O (LIO)

Logical I/O is also part of the Master Control Program (MCP) and involves the file interface code. Whenever writing is done to a file or read from a file in a program, the system is actually calling the MCP module called Logical I/O. The Port File interface code is also a subpart of logical I/O. It has its own module but provides Logical I/O functions for the Port Files. The regular Logical I/O operates with disks, tapes, printers, card punches and other peripherals.

17. Gather Simulation

This is provided by code in the physical I/O. Gather is an output operation whereby the I/O management module goes to the memory and gets certain messages or data from one location and then from another location and from another location and puts it together in order to pass it on to a particular peripheral such as a tape.

Contrarily, "scatter" operates the other direction, for example, the IOM will indicate that it has a stream of bits from a particular tape and it is then going to put some of this information here in one place, some of it here in another place and some of it in another or third place and that is the "scatter" operation.

18. Network Processor

Examples of these units are Channel Adapters, Integrated Communication Processor (ICP), Emulated Integrated Communication Processor (EICP), DICPs and Network Interface Cards. An integrated communication processor is often called a Data Link Processor (DLP) and, in particular, ICP is a Data Link Processor that has a Network Interface Card (NIC) associated with it. Channel Adapters also have Network Interface Cards.

18a. An emulated ICP is a portion of software that "pretends" to be the Network Interface Card on a system that operates on the basis of emulating the I/O mainframe system, such as was done in the Unisys Micro-A or Unisys A-7 and other systems. These systems do not supply any Specialized I/O hardware but rather provide software that emulates that Specialized hardware. Thus an emulated ICP is a portion of software that pretends to be and operate as if it were ICP/DLP.

18b. Direct Intergrated Communication Processor (DICP)

The DICPs are also actually known as "channel adapters" and they are the units that replace the datalink processors (DLP) in the new I/O architecture. Thus a direct integrated communication processor is a channel adapter that does networking operations.

19. Interfaces—Cooperative System Services

They involve (i) an input data path for dialogs associated with the Connection Library between the Network Provider and the DSS; (ii) an output data path for dialogs associated with the Connection Library between the DSS and the Network Provider.

20. Channel Adapters (CA)

A channel adapter is a device that enables hardware using two different types of communication channels to communicate.

21. Path Sub-System (PSS)

This is the peer of NP Support that runs in the integrated communication processor (ICP), the emulated integrated communication processor (EICP) or the direct integrated communication processor (DICP). This is the unit that the NP support talks its QSP protocol to.

22. Protocol Stack Extension Logic (PSEL)

This is part of the network provider involving its protocol stack that runs in the integrated communication processor (ICP).

23. COMS

This represents a communications management system. It is a Unisys message control system that supports processing for a network on the Unisys ClearPath NX server. It is described in the reference: Unisys A Series Communication Management System (CMS) operations guide, May 1989, Doc. 1154523.380.

24. Protocol Specific Handler (PSH)

This is software which talks to items such as communication processors in order to get terminal access.

25. Network Selector Module (NSM)

This is part of Ports Module in the Master Control Program (MCP). Its purpose is to take a User's File Open Request, a port file, and determine which Network Provider should be used. The Network Selector Module 9 (FIG. 3A) selects a Network Provider 20 to use for a specific instance of the port interface.

26. Library Template

A structure built by the compiler and maintained by the MCP to determine the procedures, functions and items to be imported from the Connection Library.

27. Pipe

A pipe is a path (input or output) between a Network Provider and the Channel Adapter/Integrated Communications Processor (CA/ICP), which is associated with a specific end point. A pipe can be associated with a connection end point on the ICP/CA for output or to a specific entity end point (upper layer protocol) in the Network Provider for input. The use of pipe is defined by the Network Provider and the CA/ICP and the QSP IDs which are used to uniquely identify each pipe. QSP refers to the Queue Service Provider. A pipe may or may not map directly to a specific queue.

28. Queue

A queue number identifies a specific I/O queue relative to a particular ICP/CA (Integrated Communications Processor/Channel Adapter). Each queue is an independent list of I/O requests. Within each queue, requests are ordered. There is no ordering of requests in different queues. The ICP/CA is given one request at a time (the one at the head of the list) from each queue.

29. Queue Service Provider (QSP)

This is a unit that provides the queue service to a requester. It is basically a protocol that puts everything into one queue and takes it all back off. That protocol is called QSP protocol (Queue Service Provider).

30. Pipe ID

A field in the QSP protocol which identifies the logical pipe. It is used for multi-queue simulation.

31. Dialog

A dialog or dialogs are operations which carry data between different applications processes. Dialogs can be logically set to carry data over a computer network. In a computer network, dialogs provide data communication between application processes running on different end systems or hosts. Dialogs can also carry data between application processes running on the same host. Dialogs are implemented by the use of the various functional layers for example, Application, Presentation Session, Transport, Network, Link and Physical, which are used in data communication networks to provide various services and also reliability. Each layer will have its own particular protocol and range of fundamental instructions in order to provide services. Dialog operations and particular features may sometime include the scatter support and gather support.

32. Connection Library Element

This is one element of the Connection Library which may involve multiple elements. It provides implementation of an interface, much like the FILE object in a program (which is not the the actual file on disk), but rather it is an OBJECT in the program that allows access to an actual file on the disk.

33. Network Provider

A software operation which implements the Presentation, Session, Transport and Network Layer portions of the relevant protocol stack in the MCP environment.

34. Lock

An object which can be used to ensure that only one entity is accessing a shared resource or object at any given time.

35. PIE-CL

Process Inter-communication Element-Connection Library.

36. PIE-CB

Process Inter-communication Element-Connection Block.

37. PIM-CL

Processor Inter-communication Manager Connection Library.

38. PIM-CB

Processor Inter-communication Manager Connection Block.

39. Open_Sequence is a protocol dependent exchange of messages which establishes a dialog.

40. Interface Name

This is a library attribute defined in Unisys Corporation's published document 8600 0494 entitled "ClearPath HMP NX and A Series Task Management Programming Guide".

41. E-Mode

The operator set for Unisys Corporation's A-Series computers.

42. E-Mode Environment

The operating environment of a machine which supports E-Mode and runs the Master Control Program (MCP). 43. EIO File Object A file system-based mechanism used to associate an instance of Network Processor Support (FIG. 3B, element 35) with a Network Processor (Glossary Item 18).

44. Link Library

A function call of the (Master Control Program) which creates a binding link between two Connection Libraries (CL's).

45. Data Path CL (20n, FIG. 3B)

The Connection Library object used by the Network Provider to talk to Network Processor Support and Physical I/O or vice-versa. It is shown as element 20n in FIG. 3B.

General Overview

FIG. 3 (A) is an overview of a specialized high speed datacom system where a User terminal 8 utilizes the interconnecting bus 60 to connect to a first computer system 3 and a second computer system 3p which is basically a duplicate copy of the first network.

There are different categories of elements involved in FIG. 3A which can be summarized as follows:

(a) Network Providers designated NP, which may involve the TCP/IP protocol, or other protocols.

(b) The Users of the Network Providers, such as the DSSs (Distributed System Services), COMS (Communication Management System), and PSHs (Protocol Specific Handlers) which interface terminal-related protocols to the COMS program defined in the Glossary.

(c) Master Control Program (MCP), which is the main operating system of which one portion includes the Network Selector.

(d) The Network Support items, such as the interface to the Network Selector, the DSS Router Interface, and the network software installation and configuration.

Referring to FIG. 3A, it will be seen that each computer system 3 and 3p is composed of correspondingly similar modules which can be described below for example, in connection with the network 3, of FIG. 3A.

The User terminal 8 will communicate with the low-level kernel 28 of computer system 3 which is in communication with the network data path 30 which communicates with the network's protocol stack 20 (Network Provider). The network's protocol stack 20 has a communication line 21 to the DAS 22, (Distributed Application Supervisor) which has two communication lines to the low-level kernel 28, these communication lines being shown as 23s and 23i. The network's protocol stack communicates to a Connection Library 18u which connects to the Ports module 18. The Ports module 18 is in communication with the Port Interface 14 which is in communication with the User program 10p. The subject of the present disclosure is the Cooperative Service Interface 12 shown connected in the computer system 3 between the network's protocol stack 20 (Network Provider) and the service module 10s, generally designated as Distributed System Service (DSS) 10s or 10p (network 3p) in FIG. 3.

FIG. 3A involves a service networking operation, where for example, there are two peer computer systems 3 and 3p. One computer system such as computer system 3 will have a User terminal 8 which connects to it, and also connects to the second computer system 3p.

For example, the User terminal 8 may have a payroll application program, while the databases for this may reside in computer system 3 or computer system 3p.

The low-level kernel 28 and 28p are software interfaces which connect to the computer networks. In the User terminal 8, there could be an equivalent interface called the Network Interface Card.

Each of the computers contain multiple protocol engines, each of which supports a protocol, such as TCP/IP, UDP (User Datagram Protocol) and other internet protocols.

The Ports 18 and 18p are file interface-based software which allows programs to send messages to other programs across the network, so that programs can talk to other programs. The software in the Port Interfaces 14 and 14p, are basically placed in the MCP or Master Control Program, and they operate as system software within the MCP (40 of FIG. 2). The User programs 10c1 and Service 10c of FIG. 3B could be in a PC, or a UNIX machine, or a Unisys 2200, or a Microsoft NT platform.

Figure 3B:
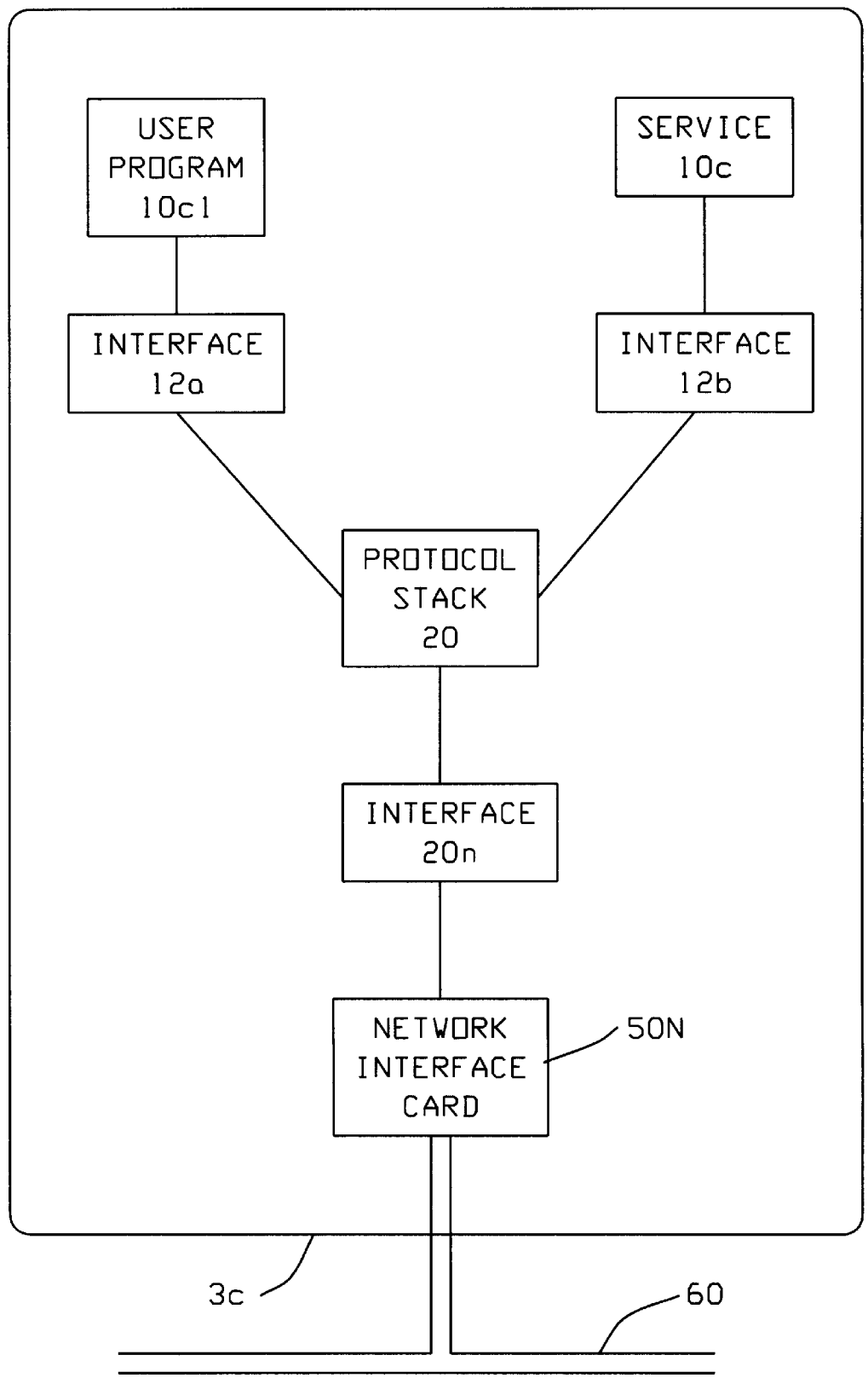
FIG. 3B is a drawing of a simplified concept of the computer system on a network.

FIG. 3B illustrates a generic architecture for a computer system, such as for UNIX platforms, where User Program 10c1 correlates to 10p of FIG. 3A; and 10c of FIG. 3B correlates to 10s (Service) of FIG. 3A. The interfaces 12a, 12b of FIG. 3B correlate Port I/F 14 of FIG. 3A and the Protocol Stack 20 of FIG. 3B correlates to Network Provider 20 of FIG. 3A. The interface $20_n$ of FIG. 3B correlates to the I/O interface 40 of FIG. 2 while the Network Interface Card 50N of FIG. 3B correlates to the Network Processor 50 of FIG. 2 which can connect to bus 60 of FIG. 3A.

The operations of FIG. 3A function such that the computer system 3 could become a sender and send a message to computer system 3p which could become a receiver, after which the computer system 3p becomes a sender and sends back an answer to computer system 3 as the receiver.

In FIG. 3A, each of the computer systems 3 and 3p will have a DSS Router 11 and Network Processor Support Module 35. Further, a Port 18 associated with port interface 14, assigned communication with a Network Provider 20 by the Network Selector Module 9.

It should be understood that the FIG. 3A computer system 3 and the system 3p may be a long distance apart, such as in different cities or different countries.

The Port Interfaces 14 and 14p are part of the I/O subsystem, and are described in the Unisys I/O Subsystem Programming Guide, Document number 86000056, published June 1995.

As seen in FIG. 1, the present Output interface method and system involves the transfer of dialog messages between a Distributed System Service (DSS) 10 and a Network Provider 20.

The DSS can generally be any software program, but typically is an implementation of the "Application Layer" (Layer 7) which defines the language and syntax that a program uses to communicate with another program as part of the OSI (Open Systems Interconnection Standards). The Application Layer may involve services such as FTP (File Transfer Protocol), FTAM (File Transfer and Management) and messaging protocols such as mail, Telnet and other terminal access protocols.

The Network Provider 20 of FIG. 1 is also often referred to as Network Transport Protocol Implementation such that the Network Provider (NP) is an implementation of the hierarchical layers (6,5,4,3) "below" the Application Layer 7. The Network Provider thus implements the protocol stack for the lower layers such as TCP/IP, UDP/IP, BNA or the OSI presentation layer down.

The Network Provider 20 encompasses the Presentation (Layer 6), the Session (Layer 5), and the Transport (Layer 4), and the Datalink (Layer 2) is implemented in the Network Processor in the Network Interface Card 50 of FIG. 2. The Network (Layer 3) is typically implemented in the Network Provider, but also may be implemented in the Network Processor.

The present disclosure for the Cooperative Service Interface 12 and its method of operation will be seen in the broad view of FIG. 3A, as the interface between the service module 10s, also called "DSS" (Distributed System Service), and the Network Provider 20, also called the "Network Protocol Stack". Thus, the Cooperative Service Interface 12, which is the focus of this disclosure, is the programmed interconnecting operational activities between the DSS 10 and the Network Provider 20, of FIG. 1.

A brief overview of the Cooperative Service Interface 12 is shown in FIG. 1, where the Distributed System Service 10 is interrelated to the Network Provider 20 through use of a set of buffer pools, and a lock pool.

Thus, in FIG. 1, the DSS 10 has a Connection-Library Element 10e, which has a dialog lock pool 11d, a reference to which is transmitted to the Network Providers Connection-Library Element module $20_e$. A Connection Library $10_c$ contains the DSS's Connection Elements 10e.

Further, the Network Provider 20 has a header buffer pool 20b which is associated with the Network Provider's Connection Library $20_c$. The Connection-Library Element $20_c$ has an input buffer pool $20_{ip}$, whereby data is made available (shared) to the DSS Connection-Library Element $10_e$. Likewise, the DSS Connection-Library Element $10_e$ has an output buffer pool $10_{op}$, whereby data is made available (shared) to the Network Provider's Connection-Library Element $20_e$. The Connection Library $20_c$ contains the Network Provider's Connection Elements $20_e$. A Connection Library $20_c$ contains the Network Provider's Connection Elements $20_e$.

Description of the Preferred Embodiment

There are a number of significant features which are provided by the described Cooperative Service Interface 12. These features include the elimination (Seen in FIG. 3A) of a Port I/F (logical I/O 14) and ports 18 which would normally be required for the DSS's data path. The Network Selector Module need not be used when the Cooperative System Service interface is used. The buffer sharing between the Network Provider 20 and the DSS 10 will be seen to (i) eliminate data copies, and (ii) eliminate call-back procedures. The arrangement for lock-sharing between the Network Provider 20 and the DSS 10 will be seen to (a) simplify the locking procedures, and (b) eliminate the lock-related timing holes. The Cooperative Service Interface 12 presents certain advantages over its predecessors which previously involved a synchronized port interface which used connection blocks (CBs); and the new Cooperative Service Interface now uses a CL-oriented interface, providing a CL-oriented (Connection Library) interface which allows the elimination of the logical I/O port, but also now allows buffer sharing.

The Cooperative Service Interface 12 has certain key features of enhancement which involve (i) the locking strategy whereby dialog locks will be shared between the DSS 10 and a Network Provider 20. Further, (ii) the use of buffer-sharing whereby ownership of the Network Provider input buffers is logically transferred to the DSS 10 when the DSS 10 chooses to retain a buffer delivered to the DSS 10. The ownership of the DSS 10's output buffers is logically transferred to the Network Provider 20 for transmission when the output is requested. As a result, much data-copying is eliminated.

The ownership of buffers shared in this way is later returned to their original owner when the borrower is finished with them.

Referring to FIG. 2, there is seen a drawing of the utilization of the Cooperative Services Interface 12 by means of showing two main channels of the data flow, that is to say, the output path, and the input path. Here in FIG. 2, there is seen the DSS 10 having an outgoing buffer pool $10_{op}$, a lock pool $10_{Lp}$, and an image of the input buffer pools, $10_{ip}$, which consist of pointers to the actual pool, $20_{ip}$ in the Network Provider 20.

In communication with the DSS 10, is the Network Provider 20, which is seen to have an input buffer pool $20_{ip}$, and where there occurs an image $20_{ip}$ of buffer pool $10_{ip}$ (involving pointers of buffer pool $20_{ip}$ from the DSS's perspective). Additionally, the Network Provider 20 has an image lock pool $20_{Lp}$ which receives pointers from the actual lock pools $10_{Lp}$, and via a Connection Library element, 11c, from the lock pool $10_{Lp}$.

The Network Provider 20 will be seen to have a set of buffer pool image pointers designated $20_{op}$, which are received from the buffer pool $10_{op}$. Likewise, an Issue Buffer Send Command is sent to the header pool $20_{hp}$ to build the protocol header in $20_{hp}$.

In the Network Provider 20, there are other paths for carrying messages from other DSSs as seen on bus 22m, and further, there is a connection 21n for inserting headers and buffer information in a PIO (Physical I/O) queue of the Physical I/O 40.

The Physical I/O 40 is a function of the Master Control Program (MCP), where it is seen that "outgoing" messages are placed on the message queue $46_o$, then transferred to the I/O storage unit 47 in order to build a header 48h, and the Write buffers 48, which are sent on bus 50b to the output unit 50o. The message-queue $46_o$ involves one output queue while $46_i$ is actually multiple in number and constitute 16 queues designated via dotted lines as $46_i$-16.

Similarly, the Physical I/O 40 will be seen to have an "input" Read image block 42, which is connected to the unit 43 in order to store messages onto the message queue $46_i$ and also to send information (Message Complete) on bus 45 to the buffer pools $20_{ip}$, and specifically for example, to a selected buffer $20_{ib}$.

Data flows are shared according to the lines headed by arrows shown in FIG. 2. The buffer pool $10_{op}$ in FIG. 2, is the output buffer pool which is owned by the DSS 10 (shown in solid lines), and is exported to the Network Provider 20 where its imported image of pointers is shown as buffer pool (pointers) $20_{op}$.

Similarly, there is shown the owners and imported images of other shared data items, such as the dialog lock pool $10_{Lp}$ owned by the DSS 10, which is exported to the Network Provider 20. The "input buffer" pool $20_{ip}$ owned by the Network Provider 20 is exported to the DSS 10, where it is consumed by the DSS which writes it to disk if it is transferring a file. The DSS 10 also can put the information in a mail box if it is receiving mail.

One output unit message queue $46_o$ (of which 16 are provided) is shown accepting output messages from "other" DSS's on bus 22m.

In FIG. 2, there is seen one input unit 43, however, there may be multiple independent input unit queues $46i$, in addition.

As seen in FIG. 2, the input path may operate into a single channel adapter 50 having a single receiving unit $50i$, which feeds input data, which is fed to the receiving unit 43 and then to the input message queues $46_{i-16}$. The top of each queue has a Read Request 42. Each request references a particular buffer ($20ib$) from the input buffer pool $20_{ip}$, Network Provider 20 issues the buffer Read command to the message queue $46_i$, then the unit 43 will transmit to the buffer pool $20_{ip}$, and thence to the image buffer pools and pointers $10_{ip}$ of the DSS 10. The individual sequence of typical steps for the input channel path are indicated in FIGS. 4C and 4D.

The interfaces between the DSS 10 (or other DSS's), and the Network Provider 20 is basically indicated in FIG. 2. These can be designated as system software interfaces.

The purpose of these system software interfaces is to manage the initialization and termination of dialogs between the DSSs 10 and remote end points, and the flow of input and output data over these dialogs.

The functions of these system software interfaces involve (a) initialization and termination, (b) utilization of the input data path, and (c) utilization of the output data path. These are later described and amplified in discussion under Section B, hereinafter.

When initializing a dialong, the Network Provider 20 is responsible for validating attributes from the DSS 10, and if no error is detected, the "Open Sequence" is initiated. The "Open Sequence" is a protocol-dependent exchange of messages which establishes a dialog. The Network Provider 20 notifies the DSS 10 when the "Open Sequence" has been completed, and when the remote side has initiated or completed termination. The Network Provider 20 must continue to handle both passive and active "opens", and the orderly and immediate "closes" (close abort).

On the "Input" path interface of FIG. 2, the Network Provider 20 is responsible for passing received data to the DSS 10 and providing the DSS the opportunity to retain the data for subsequent retrieval. If the DSS retains the data, the DSS 10 is then considered to be the "owner" of that buffer, and is responsible for notifying the Network Provider 20 when the buffer is available for re-use.

On the "Output" data path interface, the Network Provider 20 is responsible for forwarding the buffer's data, passed to it by the DSS 10, over to the physical I/O 40, after attaching the appropriate headers. The Network Provider 20 is also responsible for notifying the DSS 10 when the buffer's data becomes available. Further, the Network Provider 20 is responsible for notifying the DSS 10 when outbound flow control is entered and is exited.

In regard to FIG. 2 in earlier implementations (later discussed in connection with FIG. 5), a DSS would use the buffer pool $10_{op}$, and the DSS would indicate that it needs to send a message to the service on another machine, so that the DSS would call the Network Provider 20. Then the Network Provider 20 would copy the data again, and the Network Provider 20 would now have his own copy of the data from the buffer pool $10_{op}$. Then the Network Provider 20 would send the data down to be copied by the Physical I/O 40 through the queue $46_o$, and the data would get copied into the memory of the Channel Adapter 50 (FIG. 2).

Now in the present system, the DSS 10 builds the data directly into the buffer pool $10_{op}$. However, since the system is now sharing the references to this buffer pool $10_{op}$, it is not necessary to copy it over to the Network Provider 20. What happens here is that the Network Provider 20 builds a header in header pool $20_{hp}$, which will be useful for sending or transmitting the data in $10_{op}$ to the DSS 10 or another machine. The Network Provider 20 uses the image pool $20_{op}$ of the buffer pool $10_{op}$ which involves a selection of pointers.

Under the earlier methodology, the User would have some data, and would call the DSS 10 to send the data to a buffer pool in the Network Provider 20, plus a header pool to describe what was going to happen to the data. Then the User would say he needs to send that information and would call the Network Provider 20, which would operate to say "I put my own header material on the front, and then behind this I have the messages from the DSS 10, and I will pass this down another level to the Physical I/O 40 to be sent to the Channel Adapter." Thus, what was done was to copy the User data into the DSS buffer, and then "again copy" the User data and the DSS data into the Network Provider buffer, (in the Network Provider 20). Then the entire message data and header package would be sent out to the I/O 40 and the Channel Adapter in 50.

Quite contrarily, under the presently described system, the real buffer $10_{op}$ of the DSS 10 is then placed as an image pointer in the Network Provider 20. This image is merely just a reference into the memory of the DSS 10.

So what is done is to copy the User's data into the DSS's buffer $10_{op}$, and still put the DSS's header on the front of it, but now, under the present system, it is not necessary to copy this data into the Network Provider 20. The image buffer pointer pool $20_{op}$ of the Network Provider 20 is not a copy of the data, but is merely a reference unit using pointers, which involves functions similar to that of a pointer looking into another person's memory. So a considerable savings is initiated since it is much faster, in that it is not necessary to "copy" the data, but merely to set up a reference pointer to a memory.

What is still utilized here, is the Network Provider's header pool $20_{hp}$, and then using the "Gather" operation where it is possible to concentrate and pass the two buffers ($10_{db}$ and $20_{hp}$) collectively, i.e. first one, and then the second, on just one request, so no data was necessary to be copied. So now the present operation copies the data out of the User's buffer, but is not required to copy the DSS's data, or copy the DSS's copy of the User's data.

This data still sits in a section of memory and it gets sent out on the wire, and when the "send" is finished, it tells the DSS 10 that the transmission was completed.

The data in memory remains in the DSS buffer pool $10_{op}$, so that there is the concept of "buffer sharing" which is operating in the outward path direction. Likewise, this is also done in the inward, or input path direction.

Thus, the module which owns the buffer, for example, the Network Provider owning the buffer pool $20_{ip}$, passes the reference pointers to $10_{ip}$ of the DSS 10 and it does not have to copy the data and pass it on.

So rather than copying, for example, on the input path channel, it is only necessary to get in the "message" which has three parts to it; (i) the Network Provider portion 20 on the front, then (ii) the DSS 10 part in the middle, and then (iii) the "User" part on the end. Thus, rather than copying (which formerly had to be done), it is just now necessary to copy this particular part into the buffer $20_{ip}$, which would then be copied into the User's Buffer by utilization of the image pointers or buffer pools $10_{ip}$. These pointers are a view pointing to the memory, so that the DSS 10 has a view of the memory that belongs to the Network Provider 20.

Then the Network Provider 20 sends the pointers which access the memory for transmission to the User buffer.

So what is actually being done is to tell the DSS 10 where the dialog information is located in the buffer, $20_{ip}$ of the Network Provider 20.

The Cooperative Service Interface involves a series of line interactions. It involves the "projection" of the two buffer pools $10_{op}$ and $20_{ip}$ from one environment into the other, using a set of pointers which are in the interface, these image pointers being $20_{op}$ and $10_{ip}$.

It may be noted there is a similar set of image pointers for the lock pool $20_{Lp}$ which operates for coordination to make sure that two requesters are not trying to access the same memory location at the same time.

The following discussion will involve one example of the algorithmic sequence of steps by which the present system can move and transfer dialogs from between the DSS 10 and the Network Provider 20 using the medium of the Network Data Path interface 30 and the Master Control Program and Physical I/O 40. A more detailed set of step sequences is described later in connection with FIG. 5 and FIG. 2.

Figure 4A:
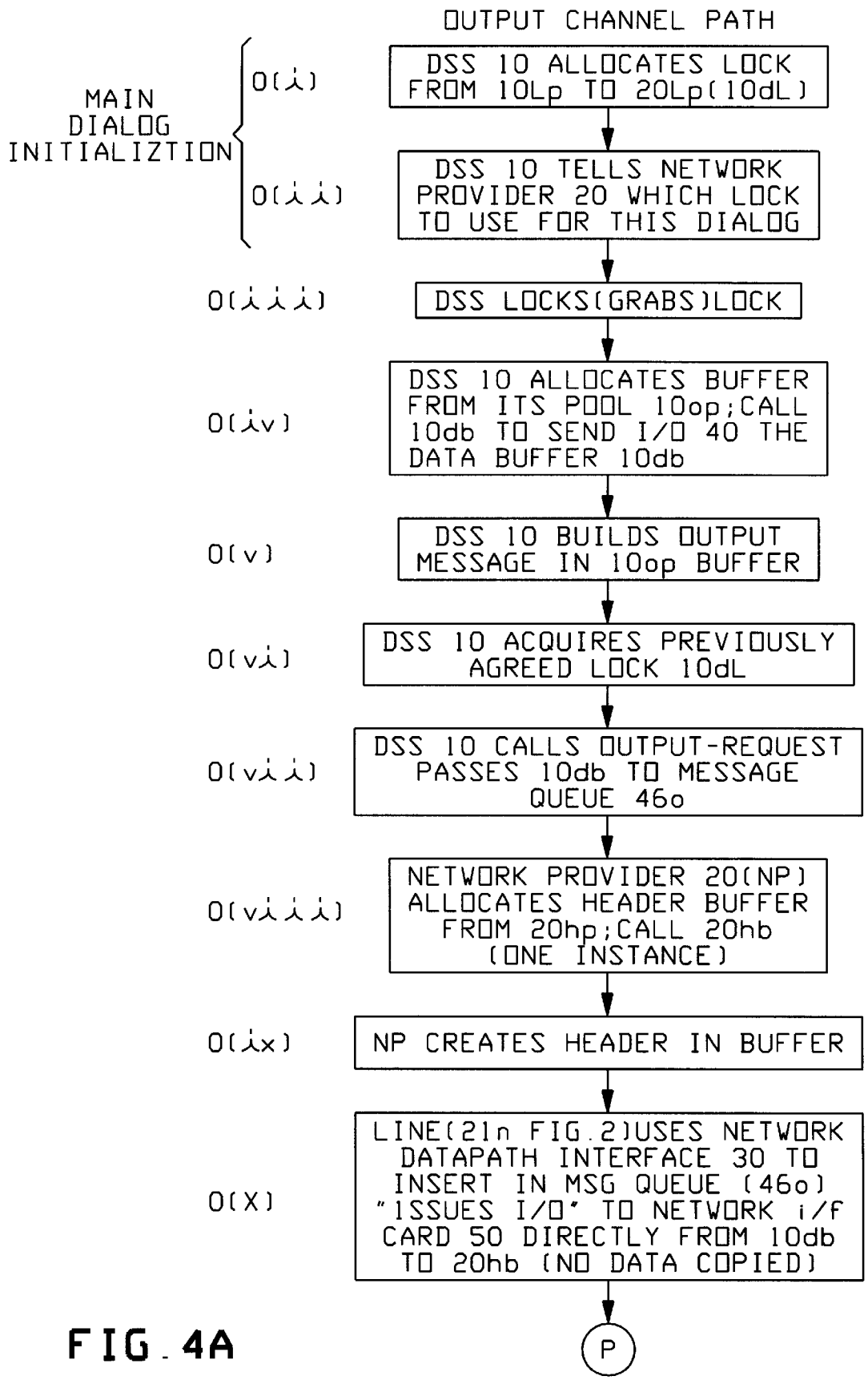
FIGS. 4A, 4B illustrate one example of a flow chart of software sequence steps using an Output Channel Interface Path for message dialog transfer.
Figure 4B:
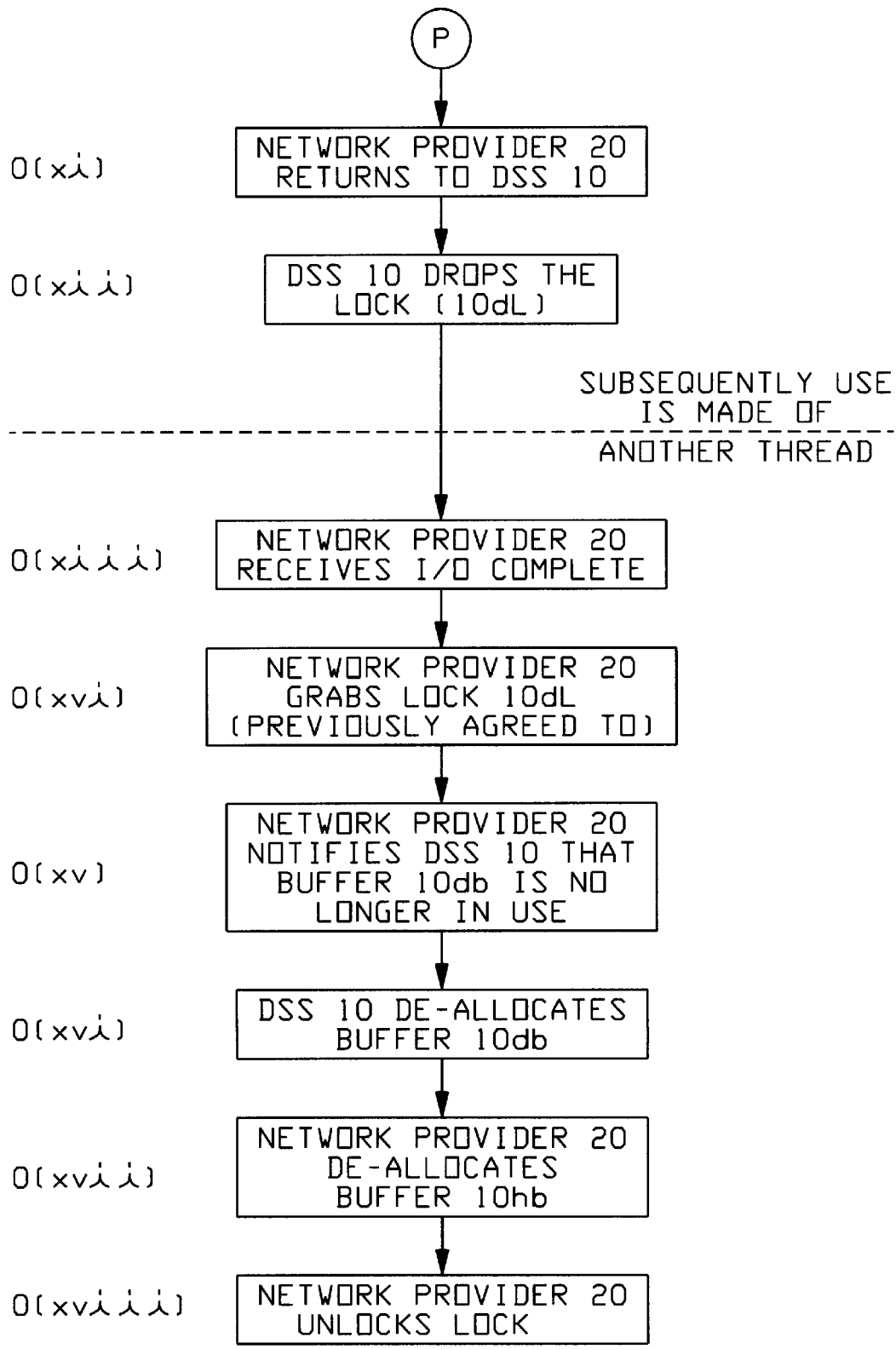
Figure 4C:
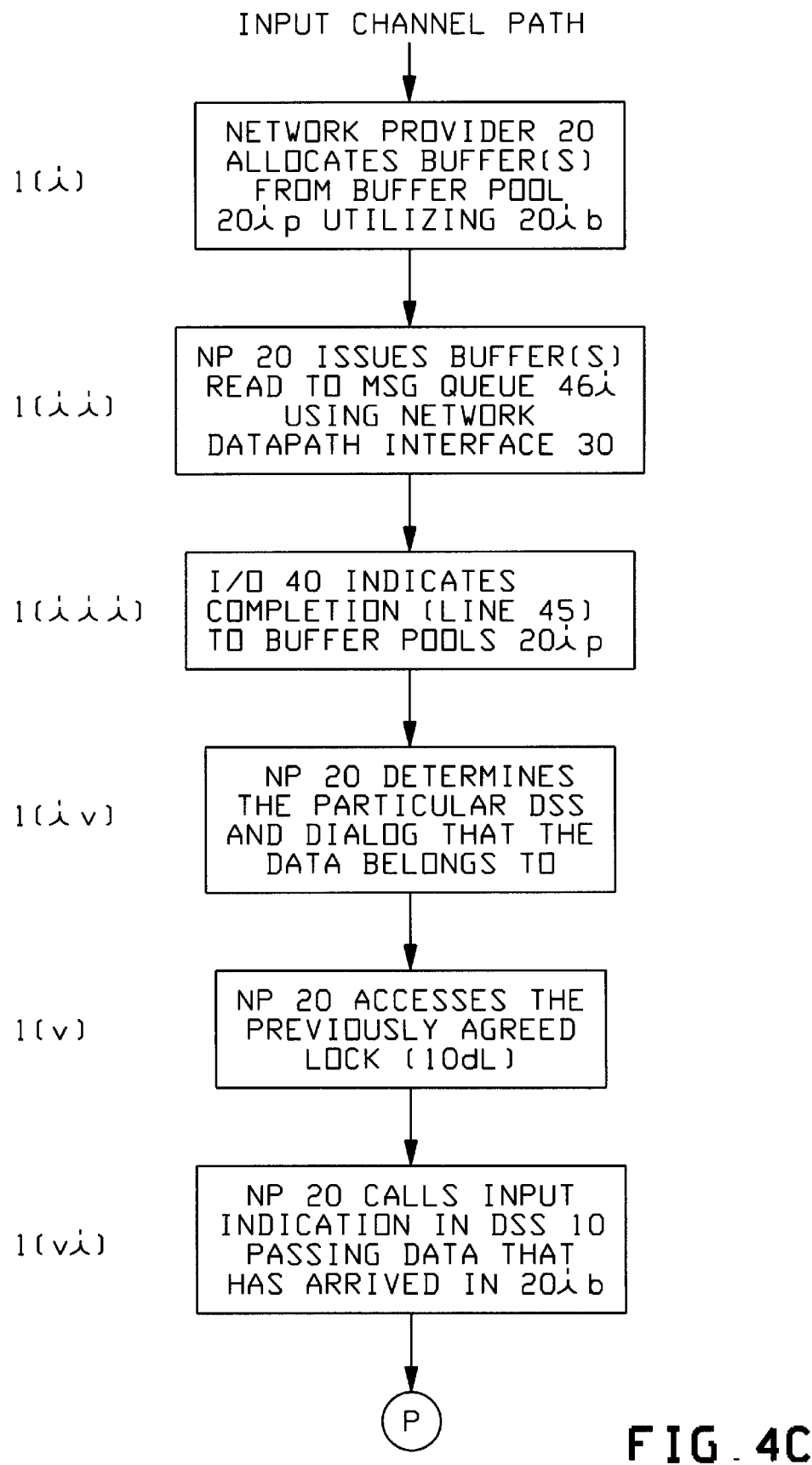
FIGS. 4C, 4D illustrate one example of a flow chart of software sequence steps using an Input Channel Interface Path for message dialog transfer.
Figure 4D:
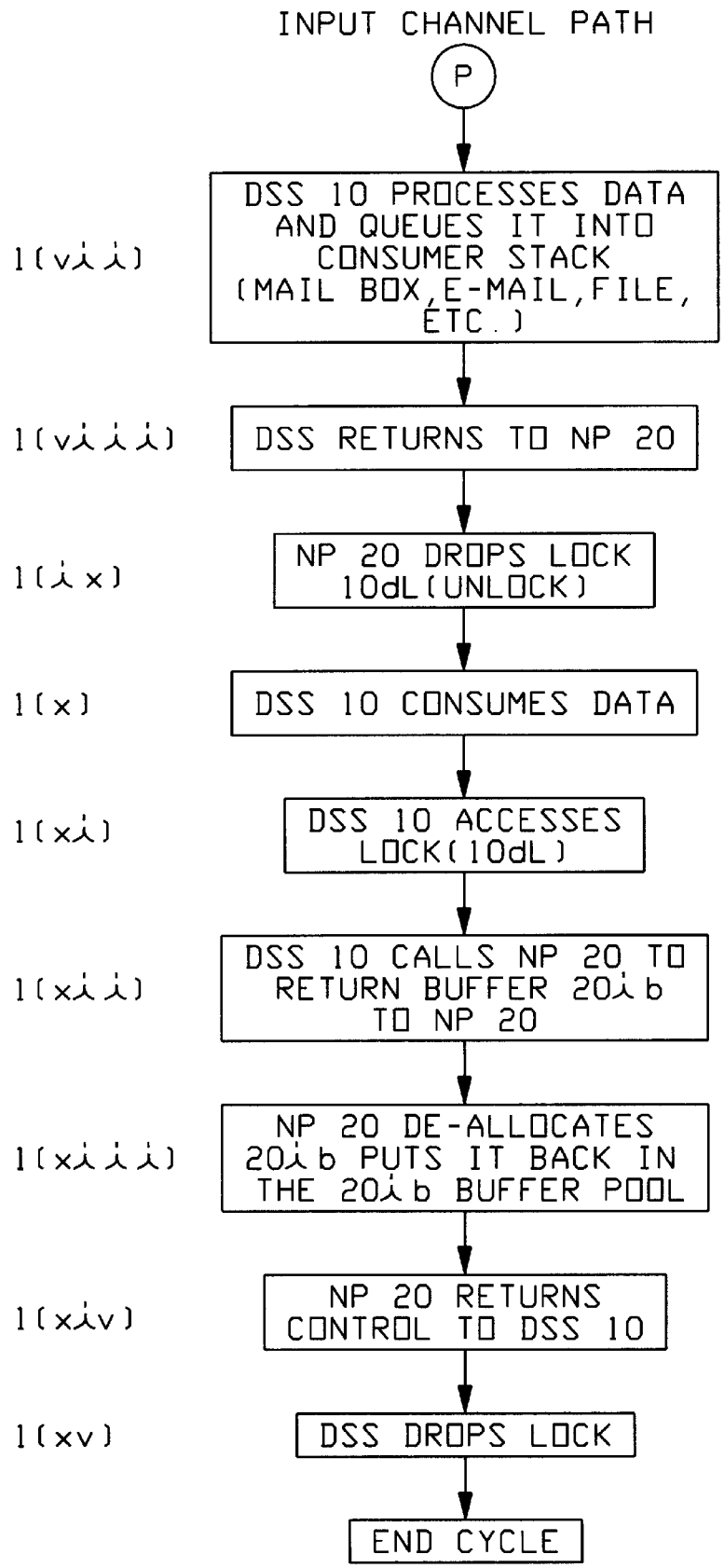

This sample initial sequence will be shown in two different flow directions, that is to say, the flow direction designated as the "Output Channel Interface" path of FIG. 2 which will be illustrated in FIGS. 4A and 4B.

The flow path shown as the "InputChannel Interface" path of FIG. 2 will be illustrated in FIGS. 4C and 4D.

Now referring to FIGS. 4A and 4B, there will be illustrated the Output Channel Interface Path.

Output Channel Interface

At step 0 (i), the DSS 10 will be seen as allocating a lock from the lock pool $10_{Lp}$ with a specific lock designated $10_{dL}$.

This is connected to the lock pool $20_{Lp}$ (FIG. 2) of the Network Provider 20.

At step 0 (ii), the DSS 10 tells the Network Provider 20 which lock is to be used for this dialog. For example, this could be the lock $10_{dL}$ of the lock pool $10_{Lp}$.

A dialog is initiated and identified when the DSS 10 uses its protocols and then calls "Open Request" after which the Network Provider 20 uses its protocols and then calls "Open Indication".

At step 0 (iii), the DSS locks the lock.

At step 0 (iv), the DSS 10 allocates a particular buffer $10_{db}$ from its buffer pool $10_{op}$; then it calls Issue Buffer Send Command with the specific buffer $10_{db}$ to be sent to I/O module 40 using the data buffer $10_{db}$.

At step 0 (v), the DSS 10 builds an output message in the buffer pool $10_{op}$.

At step 0 (vi), the DSS 10 then acquires the previously agreed-upon lock, $10_{dL}$. This protects the dialog-related state thus keeping any other input from arriving at the same time that ongoing output is being sent.

At step 0 (vii), the DSS 10 calls an Output_Request and passes the data in buffer $10_{db}$ through the Network Data Path interface 30 and into the message queue $46_o$.

At step 0 (viii), the Network Provider 20 allocates a header buffer $20_{hb}$ from the header buffer pool $20_{hp}$ in order to build the protocol header, which is utilized as $20_{hb}$; the Network Provider NP 20 then calls the header pool $20_{hb}$ which takes the buffer $20_{hb}$ and unlocks this dialog so that it can be sent to the message queue $46_o$ through the line $21n$.

At step 0 (ix) the Network Provider (NP) 20 creates the Header in buffer header pool $20_{hb}$.

At step 0 (x), using line $21n$ (FIG. 2), the Network Provider 20 uses the Network Data Path interface 30 to insert the dialog message in the message queue $46_o$; it issues a I/O to the Network Interface Card 50 directly from the buffer $10_{db}$ over to the header pool $20_{hb}$ (no data is copied).

At step 0 (xi), the Network Provider 20 returns control to the DSS 10.

At step 0 (xii), the DSS 10 now drops (unlocks) the lock on $10_{dL}$.

At step 0 (xiii), the Network Provider 20 receives a I/O complete signal via line 45 of FIG. 2.

At step 0 (xiv), the Network Provider 20 now grabs the lock $10_{dL}$ which was previously agreed-to in the lock pool $10_{Lp}$ of the DSS 10.

At step 0 (xv), the Network Provider 20 notifies the DSS 10 that the buffer $10_{db}$ is no longer in use, and thus it is now available for future use.

At step 0 (xvi), the DSS 10 then de-allocates the buffer $10_{db}$.

At step 0 (xvii), the Network Provider 20 de-allocates the buffer $20_{hb}$ (FIG. 2) in the Header Pool $20_{hp}$.

At step 0 (xviii), the Network Provider 20 drops (unlocks) the lock, $10_{dL}$.

Input Channel Interface

Now in regard to the "Input Channel" path, as was indicated in FIG. 2, the following sequence of steps will be illustrated in FIGS. 4C and 4D.

At step I (i), the Network Provider 20 allocates a buffer or buffers from the buffer pool $20_{ip}$ and targets the utilization of buffer $20_{ib}$.

At step I (ii), the Network Provider 20 issues a buffer Read to the message queue $46i$ through the network Data Path Interface 30.

At step I (iii), the I/O module 40 indicates a completion on line 45 to the buffer pools $20_{ip}$.

At step I (iv), the Network Provider 20 determines the particular DSS and the particular dialog that the data belongs to.

At step I (v), the Network Provider 20 accesses the previously agreed-upon lock, $10_{dL}$ in the lock pool $10_{Lp}$ of the DSS 10.

At step I (vi), the Network Provider 20 calls an Input_ Indication in the DSS 10 so that there is a passing of data that had arrived in $20_{ib}$, over to the DSS 10, via the image buffer pool pointers $10_{ip}$.

At step I (vii), the DSS 10 processes the data and queues it into a consumer stack, such as a mailbox or other file, etc.

At step I (viii), the DSS 10 returns control to the NP 20.

At step I (ix), the Network Provider 20 drops (removes) the lock $10_{dL}$.

At step I (x), the DSS 10 consumes the data, i.e., passes the data to a mailbox or other terminal.

At step I (xi), the DSS 10 (locks) the lock, $10_{dL}$.

At step I (xii), the DSS 10 calls the Network Provider 20 in order to return ownership of the buffer $20_{ib}$ to the Network Provider 20.

At step I (xiii), the Network Provider 20 "de-allocates" (releases) the buffer $20_{ib}$, and puts back dialog availability in the buffer pool $20_{ip}$.

At step I (xiv), the Network Provider returns control back to the DSS 10 over buffer pool $20_{ip}$.

At step I (xv), the DSS 10 drops the lock, $10_{dL}$.

The Cooperative Service Interface provides additional performance over the earlier types of Sync_Ports by allowing a Network Provider and a DSS to bypass the Port File code in the Master Control Program (MCP), by allowing it to share data and by relaxing the rules about what can be performed as part of an input notification.

Figure 5:
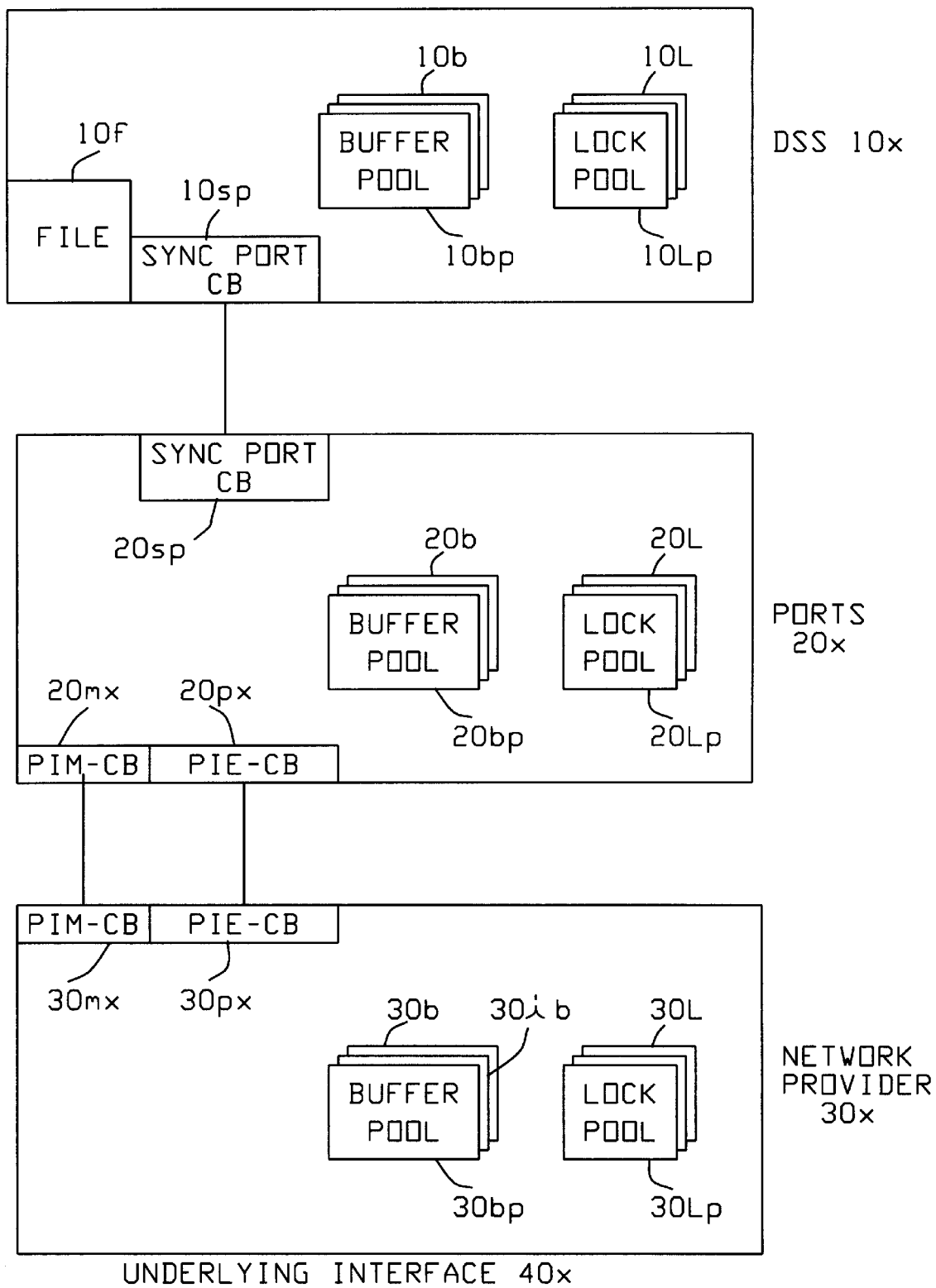
FIG. 5 is a drawing of an earlier networking software architecture which involved undesired latencies and multiple lock pools.

The interface between the MCP's Port File code and the Network Providers was previously implemented as an old-style Connection Block (CB), FIG. 5. By changing this condition to a Connection Library (CL), FIG. 1. This provided a performance advantage by eliminating the MCP overhead required to access entry points exported via a Connection Library (CL). Because Connection Libraries can export data items in addition to procedures, this change also allows for Port File code and the Network Providers to "share" dialog-oriented locks. Such sharing allows elimination of the elaborate lock-deadlock avoidance code previously employed and is now permitted to be simplified greatly, thereby not only improving performance, but also closing numerous timing windows. Sharing locks this way also obviates the need for several of the more complex interfaces previously required.

The E-mode-based portions of Network Providers currently communicate with their ICP-based (Integrated Communication Processor) components via an interface provided by NP Support. The NP Support provides a complex path CB (Connection Block) interface which Network Providers use to get the data they wish to send into a I/O capable buffer, and it generates and parses the Queue Service Provider (QSP) protocol in order to multiplex the numerous dialogs the Network Providers have over a single physical unit queue.

In the improved architecture, multiple queues are provided between the E-mode environment, and a given Channel Adapter environment, obviating the need for the earlier multiplexing function, and eliminating the de-multiplexing bottleneck on the NP/Controller stack on the input. Since the QSP protocol generation is very simple, that function has been moved into the Network Providers. This redistribution of function allows the NP Support to be eliminated from the data path.

To avoid the necessity of copying data in order to assemble Network Provider-generated header data, and data from multiple-user buffers into one contiguous memory area, the ability to Gather data from multiple buffers on output is added to the I/O processor. The physical I/O simulates Gather in cases where the I/O processor does not support it directly.

In addition, a Scatter feature is provided, so that a single incoming data message can be split across multiple buffers. This is used by the Network Providers to ease their memory management problems; they have consolation code to cope with cases where Scatter is not provided by the I/O processor.

Data And State Sharing

The buffer pool $10op$ shown in FIG. 2 is the output buffer pool which is owned by the DSS 10, and is exported to the Network Provider 20 where its imported image is shown with the dashed lines as $20_{op}$, which holds pointers.

Similarly, the same solid and dashed lines are used to show the "owners" and the imported images of other shared data items. The dialog lock pool $10_{Lp}$ is owned by the DSS 10, at $10ip$ for holding pointers and is exported to the Network Provider 20. Likewise in FIG. 2, the input buffer pool $20_{ip}$, which is owned by the Network Provider 20, is exported to the DSS 10.

One output unit queue is shown accepting output messages from other DSS's on line $22m$. The diagram in FIG. 2 shows multiple input unit queues. In actual implementation, there can be multiple independent input unit queues, up to 16 for example.

The purpose of the Cooperative Service Interface is to manage the initialization and termination of dialogs between DSS's and remote end points, and manage the flow of input and output data over those dialogs.

Initialization And Termination

The Network Provider 20 is responsible for validating attributes from the DSS 10, and if no error is detected, an "Open Sequence" is initiated. The Network Provider 20 notifies the DSS 10 when the Open Sequence has completed, and also when the remote side has initiated or completed termination. Network Providers must continue to handle both passive and active "opens", and orderly and immediate closes.

Input Data Path

On the input data path of FIG. 2, the Network Provider 20 is responsible for passing received data to the DSS 10 and providing the DSS the opportunity to "retain" the data for subsequent retrieval. If the DSS retains the data, the DSS 10 is then considered to the "owner" of that buffer, and is responsible for notifying the Network Provider when the buffer is available for re-use (de-allocation).

Output Data Path

On the output path of FIG. 2, the Network Provider 20 is responsible for forwarding the buffers passed to it by the DSS 10 over to the Physical I/O 40 after attaching the appropriate headers from the header pool $20_{hp}$. The Network Provider 20 is also responsible for notifying the DSS 10 when buffers become available. Additionally, the Network Provider 20 is responsible for notifying the DSS 10 when outbound flow control is entered and exited.

Architecture

In order to provide additional performance requirements, the Cooperative Service Interface will make use of the Connection Library mechanism, shown in FIGS. 1 and 2. Linkage is initiated by the DSS 10. This interface will not be operative before a Network Provider 20 has been established with NP Support, and may be terminated unexpectedly if the NP Support changes versions while the Network Provider 20 is running. A single Connection Library may support multiple dialogs. Thus the DSS 10 has a Connection Library $10_c$ and the Network Provider 20 has a Connection Library $20_c$.

DSS Connection Library Data Items

These data items are exported by the DSS Connection Library (CL) $10_c$ and imported by Network Provider Connection Library (CL) $20_c$.

The buffer pool $10op$ in FIG. 2 is used for DSS-initiated outbound data requests. A reference to the same buffer may be passed on to the Network Provider 20 for more than one dialog at a time. It may also be passed to more than one Network Provider at a time. As such, the Network Provider 20 may not write into the buffer. If this kind of sharing across dialogs and Network Providers is done, the DSS 10 must ensure that the "same lock" is used for all dialogs to which the buffer reference may be passed. This for example, in FIG. 2, could be a lock such as item $10_{dL}$.

In FIG. 2, the shared lock pool is designated $10_{Lp}$ and is used for guarding the "state" related to dialogs implemented over this instance of the Cooperative Service Interface 12. When calling imported Network Provider procedures, the DSS will be "holding" the shared dialog lock. The Network Provider 20 may not release the lock before returning from the call. When the Network Provider 20 calls one of the exported DSS procedures, it must do so while holding the dialog lock. The DSS 10 may not release the lock before returning from the call.

To avoid deadlocks, both the DSS 10 and the Network Provider 20 must enforce consistent lock-ordering rules regarding locks which are held at the same time as the dialog lock. In addition, if either entity needs to hold two or more dialog locks simultaneously, it must grab the one with the lowest lock number first.

Network Provider Connection Library Data Items

These are the data items which are exported by the Network Provider Connection Library $20_c$, and which are imported by the DSS Connection Library $10_c$.

In FIG. 2, the buffer pool $20_{ip}$ is the buffer pool which contains inbound requests. The DSS 10 may not Write into the Network Provider's buffer pool $20_{ip}$.

Initialization, Termination, Other Administration Interface Items

The Connection Library $10_c$ of FIG. 1 between the Network Provider 20 and the DSS 10 provides support for dialog initiation and for termination for the DSS 10. It also provides a mechanism whereby the DSS 10 and the Network Provider 20 can exchange information global to all dialogs associated with this connection library, such as the IDs of the buffer pools that will be used for input and output.

There is no automatic mechanism for returning buffers to their declarers. This must be done by the DSS 10 and the Network Provider 20. It is the responsibility of the DSS 10 to return all Network Provider buffers retained by the DSS. Similarly, it is the responsibility of the Network Provider 20 to return all DSS buffers passed to the Network Provider for transmission over the network. Buffers are to be returned as soon as convenient, but there is no requirement that buffers be returned before the dialog, that they are associated with, terminates.

In order to illustrate the improved advantages of the newly developed Co-operative Service Interface in its operational functional working in a message dialog network, an illustrative discussion section "A" will be discussed below to first indicate how the prior network architecture operated. After this, a discussion designated Section "B" will illustrate the improved operation of the presently developed network using the new Co-Operative Service Interface.

Section A: Prior Network Architecture

Referring to FIG. 5 which is a block diagram of the prior message dialog network, there is seen a Distributed System Services unit $10_x$ having a buffer pool $10_{bp}$, a lock pool $10_{Lp}$, a file 10f connected to a Sync Port Connection Block (CB) 10sp.

The Ports unit 20x has its own lock pool $20_{Lp}$ and also provides its own Sync Port CB with 20sp which connects to the DSS Sync Port CB 10sp. The Ports unit 20x also holds a PIM-CB (Processor Inter-Communication Manager-Connection Block) $20_{mx}$ and a Processor Inter-Communication Element Connection block (PIE-CB) 20px.

The PIM-CB, 20ms and PIE-CB, 20px have respective connections to the corresponding units PIM-CB, 30mx and PIE-CB 30px in the Network Provider 30x.

The Network Provider 30x will be seen to its own buffer pool $30_{Lp}$ and lock pool $30_{Lp}$ which connect to an underlying interface 40x.

The sequences of operation for the prior DSS-Sync Port Networks and the various phases involved are shown below as items A1 through A8.

A. Prior Message Dialog Interface Methods DSS Interface (sync ports), Operations A1. Initialization
   A2. Dialog Setup initiation
   A3. Dialog Setup completion
   A4. Sending Data
   A5. Resending Data
   A6. Receiving Data—Setup
   A7. Receiving Data
   A8. Delayed processing of data A1: Initialization
   1. DSS declares a file object 10f
   2. DSS Connects its sync_port Connection Block 10sp to Ports sync_port CB 10sp
   3. DSS calls Ports to associate the file object 10f with the Connection Blocks 10sp/20sp.
   4. Ports allocates a lock 20L from its lock pool $20_{LP}$ for use with dialogs that use the sync port CB 10sp/20sp and the file 10f A2: Dialog Setup—Initiation
   1. DSS selects a dialog id and lock 10L from lock pool $10_{LP}$
   2. DSS calls Open (file, dialog id) in Ports via file 10f
   3. Ports grabs its dialog lock 20L
   4. Ports validates the request and decides which Network Provider to use
   5. Ports drops its lock 20L
   6. Ports calls Initiate_Dialog in the selected Network Provider 30x via the PIM_CB 20m
   7. Network Provider 30x allocates a dialog state table and dialog lock 30L from lock pool $30_{LP}$
   8. Network Provider grabs its dialog lock 30L
   9. Network Provider does further validation of the request.
   10. Network Provider takes protocol-specific action to begin dialog initiation. This involves sending data out on the network via the underlying interface 40.
   11. Network Provider drops its dialog lock 30L
   12. Network Provider returns to Ports
   13. Ports grabs its lock 20L
   14. Ports adjusts its state information
   15. Ports drops its lock 20L
   16. Ports returns to the DSS 10x
   17. DSS waits to be notified that dialog has been initiated A3: Dialog Setup—Completion
   1. Network Provider 30x receives input data from the network.
   2. Network Provider looks at data and decides which dialog it is related to.
   3. Network Provider grabs appropriate dialog lock 30L
   4. Network Provider completes its dialog table.
   5. Network Provider calls Ports (Request_Authority via the PIM_CB 30mx) to tell it dialog has been established.
   6. Ports grabs its lock 20L
   7. Ports creates a PIE CB 20px and links it to the Network Provider's PIE CB 30p
   8. Ports causes event to notify DSS that dialog establishment is complete.
   9. Ports drops its lock.
   10. Ports returns to Network Provider
   11. Network Provider drops its lock 30L A4: Sending Data
   1. DSS 10x grabs its dialog lock 10L
   2. DSS selects a buffer 10b from buffer pool 10bp and fills it with data
   3. DSS drops its lock 10L
   4. DSS calls SP_Write in Ports via sync_port CB 10sp to send the data via 20sp to 20b.
   5. Ports 20x grabs its dialog lock 20L
   6. Ports verifies that the dialog has been properly established and that writing is allowed
   7. Ports drops its lock 20L
   8. Ports calls Send_Data_Syncport 30x in the Network Provider via the PIE CB 20px
   9. Network Provider 30x grabs its lock 30L
   10. Network Provider allocates a buffer 30b from buffer pool 30bp
   11. Network Provider builds a protocol header in the front of the buffer 30b
   12. Network Provider copies the DSS's data from the DSS's buffer 10b into the Network Provider's buffer 30b (after the header).
   13. Network Provider calls underlying interface 40x to send the data out on the network.
   14. Network Provider drops its lock 30L
   15. Network Provider returns to Ports 20x
   16. Ports grabs its lock 20L
   17. Ports adjusts its state information
   18. Ports drops its lock 20L
   19. Ports returns to DSS 10x
   20. DSS may now reuse its buffer 10b A5: Resending Data
   1. Network Provider 30x determines that data has not arrived at its remote destination 2. Network Provider grabs dialog lock 20L

3. Network Provider reuses buffer 20b built in the sending data step to send the data over the network another time.

4. Network Provider 30x drops its dialog lock 20L

A6: Receiving Data—Setup

1. Network Provider allocates a buffer 30ib from buffer pool 30bp

2. Network Provider makes the buffer available to underlying interface 40 for input delivery A7: Receiving Data 1. Network Provider 30x receives data from network into buffer 30ib via underlying interface, 40x.

2. Network Provider determines which dialog the data belongs to.

3. Network Provider grabs its dialog lock 30L

4. Network Provider adjusts its dialog state

5. Network Provider calls Data_Indication_Syncport in Ports via PIE_CB 30px

6. Ports calls DSS SP_Input_Delivery via SyncPort_CB 20sp

7. DSS grabs its lock 10L

8. DSS processes the data and decides whether input buffer can be reused

9. DSS drops its lock 10L

10. DSS returns to Ports 20x

11. Ports grabs its lock 20L

12. Ports adjusts its dialog state

13. Ports drops its lock 20L

14. Ports returns to Network Provider 30x

15. If DSS says input buffer 30ib can be reused, Network Provider returns buffer to the buffer pool 30bp

A8: Delayed Processing of Data

1. DSS 10x grabs its lock 10L

2. DSS calls SP_Retrieve_Data in Ports 20x via Sync_Port_CB 10sp

3. Ports grabs its lock 20L

4. Ports validates that dialog is active

5. Ports drops its lock 20L

6. Ports calls Retreive_Data_Syncport in Network Provider via PIE_CB 20px

7. Network Provider grabs its lock 30L

8. Network Provider locates the data the DSS is requesting in buffer 30ib and calls the formal parameter so that the DSS can process it.

9. DSS processes the data

10. DSS decides whether the buffer can be reused

11. DSS returns to Network Provider 30x

12. If the buffer 30ib can be reused, Network Provider returns it to the buffer pool 30bp

13. Network Provider drops its lock 30L

14. Network Provider returns to Ports 20x

15. Ports returns to the DSS 10x

16. DSS drops its lock 10L

The subsequent Section "B" hereinunder describes the newly developed Message Dialog Method of the Cooperative Service Interface as indicated in sub-paragraphs B1 through B8. Reference is now made to FIG. 2 whereby the following discussion indicates a broader expansion of FIGS. 4A, 4B, 4C, 4D in regard to the Co-op Service Interface Operations which will be discussed with regard to FIG. 2 whereby Connection Library units PIE_CL and PIM_CL now replace the earlier used Connection Blocks PIE_CB 20px/30px and PIM_CB 20mx/30mx, which were shown in FIG. 5.

B. Newly Developed Message Dialog Method for Output Interface Method

New DSS Interface for (Co-op Interface Operations)

B1. Initialization

B2. Dialog Setup initiation

B3. Dialog Setup completion

B4. Sending Data (Output Channel Interface)

B5. Resending Data

B6. Receiving Data—Setup

B7. Receiving Data

B8. Delayed processing of data

B1: Initialization

1. DSS 10 Connects its co-op interface CL $10_c$ to the Network Provider Co-op CL $20_c$ 2. Pointers $20_{op}$ in Network Provider 20 are created to point to buffer pool $10_{op}$ in DSS 10.

3. Pointers $20_{op}$ in Network Provider 20 are created to point to lock pool $10_{Lp}$ in DSS 10.

4. Pointers $10_{ip}$ in DSS 10 are created to point to buffer pool $20_{ip}$ in Network Provider 20.

B2: Dialog Setup—Initiation

1. DSS 10 selects a dialog id and lock $10_{dL}$ from lock pool $10_{Lp}$

2. DSS grabs lock $10_{dL}$

3. DSS calls Open_Request in the Network Provider 20 via co-op CL $10_c$

4. Network Provider allocates a dialog state table

5. Network Provider validates the request.

6. Network Provider takes protocol-specific action to begin dialog initiation. (This involves sending data out on the network via the underlying interface 40).

7. Network Provider returns to the DSS 10

8. DSS drops lock $10_{dL}$

9. DSS waits to be notified that dialog has been initiated

B3: Dialog Setup—Completion

1. Network Provider 20 receives input data from the network.

2. Network Provider looks at data and decides which dialog it is related to.

3. Network Provider grabs appropriate dialog lock $10_{dL}$ via its reference in $20_{Lp}$ 4. Network Provider completes its dialog table.

5. Network Provider calls Open Indication in DSS 10 via co-op CL $20_c$.

6. DSS notices that dialog has been initiated

7. DSS returns to Network Provider 20

8. Network Provider drops lock $10_{dL}$.

B4: Sending Data (Output Transmission)

1. DSS grabs its dialog lock $10_{dL}$

2. DSS selects a buffer $10_{db}$ from buffer pool $10_{op}$ and fills it with data 3. DSS calls Output_Request in Network Provider 20 via co-op CL $20_c$ 4. Network Provider allocates a buffer $20_{hb}$ from header buffer pool $20_{hp}$ 5. Network Provider builds a protocol header in buffer $20_{hb}$ 6. Network Provider calls underlying interface 40 to send the data out on the network. Both $20_{hb}$ and $10_{hb}$ are passed to the underlying interface without copying the data.

7. DSS may not reuse buffer $10_{db}$ until notified that Network Provider is done with it.

8. DSS drops dialog lock $10_{dL}$

B5: Resending Data

1. Network Provider determines that data has not arrived at its remote destination 2. Network Provider grabs lock $10_{dL}$ via reference $20_{Lp}$ 3. Network Provider reuses buffers $10_{db}$ and $20_{hb}$ built in the sending data step to send the data over the network another time.

4. Network Provider drops lock $10_{dL}$.

B6: Receiving Data—Setup

1. Network Provider 20 allocates a buffer $20_{ib}$ from buffer pool $20_{ip}$.

2. Network Provider makes the buffer available to underlying interface 40 for input delivery.

B7: Receiving Data

1. Network Provider 20 receives data from network into buffer $20_{ib}$ via underlying interface, 40.

2. Network Provider determines which dialog the data belongs to.

3. Network Provider grabs its dialog lock $10_{dL}$ via reference $20_{Lp}$.

4. Network Provider adjusts its dialog state

5. Network Provider calls Input_Indication in DSS via co-op CL $20_c$.

6. DSS processes the data and decides whether input buffer can be reused

7. DSS returns to Network Provider 20

8. If DSS says input buffer $20_{ib}$ can be reused, Network Provider returns buffer to the buffer pool $20_{ip}$.

9. Network Provider drops lock $10_{dL}$.

B8: Delayed Processing of Data

1. DSS grabs lock $10_{dL}$

2. DSS references data in buffer $20_{ib}$ via its pointer reference $10_{ip}$.

3. DSS processes the data

4. If DSS decides the buffer can be reused, it calls Return_Input_Buffer in the Network Provider via co-op CL $10_c$.

a) Network Provider returns buffer $20_{ib}$ to inputbuffer pool $20_{ip}$ b) Network provider returns to DSS 5. DSS drops its lock $10_{dL}$ Procedural And Parametrical Functions Of The Output Interface Operations In The Cooperative Service Interface

OUTPUT INTERFACE

The Connection Library between the Network Provider 20 (NP) and the DSS 10 provides an output data path support interface for all dialogs associated with that Connection Library.

NETWORK PROVIDER OUTPUT REQUEST

This is a procedure which is exported from the Network Provider Connection Library $20_c$ and called by the DSS 10 to send data over one of its open dialogs. The DSS 10 must have a dialog lock when this procedure is called, and the Network Provider 20 must not drop the lock.

PROCEDURE HEADER:

---

INTEGER PROCEDURE Output_Request
(NP_Dialog_ID, Buffer_Id, Length, Start_Offset, Options);

VALUE NP_Dialog_ID,
Buffer_Id
Length,
Start_Offset,
Options;
REAL NP_Dialog_ID;
Buffer_Id,
Options;

---

-continued

---

INTEGER PROCEDURE Output_Request
(NP_Dialog_ID, Buffer_Id, Length, Start_Offset, Options);

INTEGER
Length,
Start_Offset;

---

Input Parameters (Output Interface Function)

NP_Dialog_ID

This is the Network Provider's unique identifier of the dialog.

Buffer_Id

This is the identifier of the buffer to be transmitted. A reference to the same buffer may be passed to the Network Provider 20 for more than one dialog at a time. It may also be passed to more than one Network Provider at a time. As such, the Network Provider may not write into the buffer. When this kind of sharing across dialogs and Network Providers is done, the DSS 10 must ensure that the same lock is used for all dialogs to which the buffer reference may be passed.

Length

This is the length in bytes of the DSS 10 data.

Start_Offset

This is offset in the buffer where the data begins.

Options

This is a data path options word identifying the output packet characteristics.

In order to write "urgent" data, the Output_Request must be called with the urgent bit set in the Data Path Options Word. The "urgentness" is applied to all of the bytes written.

Network Provider Output Request Withinfo

This procedure is exported from the Network Provider Connection Library $20_c$ and called by the DSS 10 to send data where there is additional information related to the data that requires the Options_Array. The Output_Request should be called instead however, if the Options_Array is empty.

Both this procedure and the Output_Request are supplied, since it is anticipated that performance advantages would be gained in the Input_Indication because it needs to handle fewer cases, and could avoid parsing the Options_Array structure. Since the Cooperative Service Interface is a performance-oriented interface, the potential duplication of some code is considered a reasonable price to pay for improved performance.

The DSS 10 must have the dialog lock when this procedure is called; the Network Provider 20 must not drop the lock.

The Network Provider Output_Request WithInfo involves a procedure header as follows:

Procedure Header

---

INTEGER         PRO-
(NP Dialog_ID)  CEDURE   Output_Request_WithInfo
                         Buffer_Id,
                         Length,
                         Start_Offset,
                         Options,
                         Options_Array);
VALUE NP-Dialog_ID,
Buffer_Id,
Length,
Start_Offset,
Options;

```
        REAL  NP_Dialog_ID,
              Buffer_Id,
              Options;
     INTEGER
              Length,
              Start_Offset,
        ARRAY
              Options_Array;
```

Input Parameters (For Output Interface Functions)

NP_Dialog_ID

This is the Network Provider's unique identifier of the dialog.

Buffer_Id

This is the identifier of the buffer to be transmitted. A reference to the same buffer may be passed to the Network Provider for more than one dialog at a time. It may also be passed to more than one Network Provider at a time. As such, the Network Provider may NOT write into the buffer. When this kind of sharing across dialogs and Network Providers is done, the DSS 10 must ensure that the same lock is used for all dialogs to which the buffer reference may be passed.

Length

This is the length in bytes of the DSS 10 data.

Start_Offset

This is the offset in the buffer where the data begins.

Options

This is a Data Path Options Word for identifying output packet characteristics.

Options_Array

This is an Attribute Updaten Structure identifying output packet characteristics.

DSS Return Output Buffer

This is a procedure which is exported from the DSS Connection Library 10c and called by the Network Provider 20 to inform the DSS 10 that a buffer, given to the Network Provider 20 for transmission, is now available for re-use. If the same DSS buffer is used in multiple output requests, this procedure is not called until the Network Provider 20 has completed all of those requests. This can be implemented by a counting mechanism wherein the Network Provider 20 counts the number of references in the I/O queues, in the resend lists, and so on, which the Network Provider has to each buffer, and then only returns the buffer when that count becomes zero.

If the DSS 10 passes a buffer to more than one Network Provider, it is the responsibility of the DSS to ensure that all Network Providers have returned the buffer before re-using the buffer. The Network Provider must have the dialog lock when this procedure is called and the DSS 10 must not drop the lock.

Procedure Header

```
    Return_Output_Buffer (Buffer_Id);
    VALUE Buffer_Id;
    REAL Buffer_Id;
```

Input Parameters

Buffer_Id; This is the reference to the buffer in question.

DSS Output Flow Control Indication

This is a procedure which is exported from the DSS Connection Library $10_c$ and called by the Network Provider 20 to put a dialog in, or to take a dialog out of Flow Control. The BNA Network Provider will turn Flow Control "on" whenever the host (where the cooperating end point resides) becomes unreachable, that is to say, whenever a sub-port would change the File State to being blocked. The dialog must be locked when this procedure is called, and the DSS 10 must not drop the lock.

Procedure Header

```
    PROCEDURE     Output_Flow_Control_Indication
                  (User_Dialog_Id, FC_On);
    VALUE User_Dialog_Id,
          FC_On;
    REAL          User_Dialog_Id;
    BOOLEAN FC_On;
```

Input Parameters

User_Dialog_Id

This is the DSS's unique identifier of the dialog.

FC_On

This is a flag indicating whether the dialog has just entered or exited the Flow Control. If "True", the dialog has just entered Flow Control and the DSS 10 should now not do any further Output Requests until the Flow Control is exited. If the flag is "False", the dialog has already exited Flow Control and the DSS 10 may resume output.

Described herein has been a specialized Output Interface function for a Cooperative Service Interface between a Distributed System Service (DSS 10) and Network Provider (NP 20). After initialization and dialog set up, the DSS can export data via connection libraries to the Network Provider 20. Here the DSS grabs a dialog lock ($10_{dL}$) and selects a particular buffer ($10_{db}$) (from its buffer pool $10_{op}$) to fill it with data for export. The Network Provider allocates a buffer $20_{hb}$ from its header buffer pool $20_{hp}$ and builds a protocol header whereby the export data and header are passed out to an external module 40 and to a network after which the DSS drops the dialog lock ($10_{dL}$).

Although the described Output Interface function can be implemented as described herein, other variations may be designed which still are encompassed by the attached claims.

What is claimed is:

1. In an Output Channel Interface function of a Cooperative Service Interface (12) linking a first system service (DSS 10) and a second system service (NP 20), a method for enhancing dialog message transfer comprising the steps of:

(a) building a message, by said first system service (10), in a buffer ($10_{db}$) of said first system service (10);

(b) informing said second system service (20) to build a header, in a header pool buffer ($20_{hb}$) of said second system service for concatenation to said message in said first system service buffer ($10_{db}$);

(c) transmitting said message and header to a message queue in a receiving unit (I/O 40) external to said first and second system services.

2. The method of claim 1 wherein step (a) includes the step of:

(a1) locking, via use of a lock pool ($10_{Lp}$), said message in said first system services buffer ($10_{db}$) until said message is transmitted.

3. The method of claim 2 wherein step (a) includes the step of:

(a2) unlocking said buffer ($10_{db}$) of said first system service (10), when said message in said buffer ($10_{db}$) has been transmitted.

4. The method of claim 2 wherein step (a1) includes the step of:

(a1a) sharing a lock by said first (10) and said second system service (20).

5. A system for passing dialog messages between a Distributed System Services unit (DSS10) and a Network Provider (NP20) comprising:

(a) a DSS unit (10) having a DSS Connection Library means ($10_c$), an output buffer pool ($10_{op}$) and a dialog lock pool ($10_{Lp}$), said output buffer pool and said dialog lock pool connected to said Network Provider's Connection Library means ($20_c$);

(b) said Network Provider (20) having a Connection Library means ($20_c$), an input buffer pool ($20_{ip}$) and a header buffer pool ($20_b$) said input buffer pool connected to said DSS's Connection Library means ($10_c$);

(c) buffer sharing means which includes:

(c1) means for transferring control of specific members of said NP's input buffer ($20_{ib}$) to said DSS (10) when said NP (20) receives a dialog message to be processed by said DSS (10);

(c2) transferring control of said output buffers ($20_{ob}$) to said NP (20) when a dialog message is requested from said DSS (10), and when said DSS requests that said NP (20) transmit the dialog message.

6. The system of claim 5 wherein said DSS (10) includes:

(i) a buffer pool image ($10_{ip}$) for holding pointers to the memory of data received in said NP's buffer ($20_{ib}$).

7. The system of claim 5 wherein said NP (20) includes:

(i) a lock pool image $20_{Lp}$ for holding pointers to said DSS's lock pool ($10_{Lp}$).

8. The system of claim 7 which includes:

(d) lock sharing means to share dialog locks between said DSS (10) and NP (20).

9. A system for enhancing message dialogs using a Cooperative Services Interface (12) between a first system service unit (Distributed System Service, DSS 10) and a second system service unit (Network Provider, NP 20) comprising:

(a) said first system service unit, designated as a Distributed System Service (DSS 10) used to support communication across multi-host networks, including;

(a1) a DSS output buffer pool ($10_{op}$);

(a2) a DSS lock pool ($10_{Lp}$);

(a3) an buffer pool image ($10_{ip}$) for holding pointers to memory;

(a4) a DSS Connection Library Element ($10_e$) connecting said DSS buffer pool ($10_{op}$) to an NP-Connection Library Element ($20_e$);

(b) said second system service unit (20), designated as a Network Provider (NP 20) for providing software services to facilitate communication, including;

(b1) an input buffer pool image (20ip);

(b2) an lock pool image ($20_{Lp}$) holding pointers to said DSS lock pool ($10_{Lp}$);

(b3) a header pool ($20_{hp}$) to provide headers to messages;

(b4) an buffer pool image ($20_{op}$) holding pointers to memory;

(b5) an NP-Connection Library Element ($20_e$) connecting said Network Provider (20) to said DSS Connection Library Element ($10_e$);

(c) Cooperative Services Interface means (12) for enabling communication between said DSS 10 and said NP 20 including;

(c1) said DSS Connection Library Element ($10_e$) for connecting code files to said NP-Connection Library Element ($20_e$);

(c2) said NP-Connection Library Element ($20_e$) for connecting code files to said DSS-Connection Library Element ($10_e$);

(d) means to enable said DSS (10) to share buffer pools in said Network Provider (20);

(e) means to enable said Network Provider (20) to share buffer pools in said DSS (10).

10. The method of claim 9 which includes:

(f) means to share said DSS lock pool ($10_{Lp}$) by said Network Provider 20 and said DSS 10.

11. In an Output Channel Interface function of a Cooperative Service Interface (12) linking a first system service (Distributed System Service, DSS 10) and a second system service (Network Provider, NP 20) a method for enhancing dialogs and message transfers comprising the steps of:

(a) initializing said Cooperative Service Interface (12) by said first system service (10) connecting to said second system service (20) via a Connection Library Element means ($10_e$, $20_e$);

(b) selecting, by said first system service (10), a dialog ID and lock ($10_{dL}$) from a lock pool ($10_{Lp}$) and opening a channel to said second system service (NP 20);

(c) initializing said second system service (NP 20) to begin dialog initiation;

(d) notifying said first system service (10) that a dialog has been initiated;

(e) grabbing by said first system service (10) of a dialog lock ($10_{dL}$);

(f) selecting a buffer ($10_{db}$), from a buffer pool ($10_{op}$), to be filled with data;

(g) allocating, by said second system service (20), a buffer ($20_{hb}$) from a header buffer pool ($20_{hp}$);

(h) building by said second system service (20) of a protocol header in said buffer ($20_{hb}$);

(i) sending said data and protocol header out on an associated network to an external interface;

(j) releasing, by said first system service (10), of said dialog lock ($10_{dL}$).

* * * * *